US010645434B2

United States Patent
Wertheimer et al.

(10) Patent No.: US 10,645,434 B2
(45) Date of Patent: *May 5, 2020

(54) METHOD AND APPARATUS FOR MANAGING PROVISION OF MEDIA PROGRAMS DIRECTLY FROM CONTENT PROVIDERS

(71) Applicant: FOX NETWORKS GROUP, INC., Los Angeles, CA (US)

(72) Inventors: David Bradley Wertheimer, Los Angeles, CA (US); Michael Alan Gooch, Los Angeles, CA (US); Steven Arthur Thorpe, Los Angeles, CA (US); Bryan Jose Gonzalez, Playa del Ray, CA (US); Alexander Moore St. Laurent, Los Angeles, CA (US)

(73) Assignee: FOX MEDIA LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,458

(22) Filed: Jul. 9, 2018

(65) Prior Publication Data

US 2018/0316955 A1 Nov. 1, 2018

Related U.S. Application Data

(63) Continuation of application No. 15/653,392, filed on Jul. 18, 2017, now Pat. No. 10,021,441, which is a
(Continued)

(51) Int. Cl.
*H04N 21/2543* (2011.01)
*H04N 21/239* (2011.01)
(Continued)

(52) U.S. Cl.
CPC ..... *H04N 21/2543* (2013.01); *H04N 21/2393* (2013.01); *H04N 21/25875* (2013.01);
(Continued)

(58) Field of Classification Search
CPC .......... H04N 21/2543; H04N 21/8173; H04N 21/26283; H04N 21/25875; H04N 21/482; H04N 21/2393
(Continued)

(56) References Cited

U.S. PATENT DOCUMENTS 5,884,284 A 3/1999 Peters et al.
6,539,548 B1 3/2003 Hendricks et al.
(Continued)

FOREIGN PATENT DOCUMENTS

WO 2013152060 10/2013
WO 2014165078 10/2014
WO 2015017816 2/2015

OTHER PUBLICATIONS

Chen, D., et al., "Vertical Ownership, Program Network Carriage, and Tier Positioning in Cable Television: An Empirical Study", Review of Industrial Organization 30.3 (2007):227-251. http://www.indiana.edu/-telecom/people/faculty/waterman.
(Continued)

*Primary Examiner* — Cynthia M Fogg
(74) *Attorney, Agent, or Firm* — Gates & Cooper LLP

(57) ABSTRACT

A method and apparatus for managing a subscription to a plurality of content providers and the irretrievably referring users to an interface of the content provider to directly consume media programs provided by the content providers is disclosed. The method irretrievably passes users to content providers so that the user can view media programs from those content providers using the content provider's application, while providing a central source for users to
(Continued)

locate media programs available from a plurality of content providers and to subscribe for access to such media programs. This construct permits content providers to retain control over the user viewing experience and to encourage the user to view further media programs from the same content provider.

24 Claims, 23 Drawing Sheets

Related U.S. Application Data continuation of application No. 14/795,638, filed on Jul. 9, 2015, now Pat. No. 9,712,856.

(51) Int. Cl.
*H04N 21/482* (2011.01)
*H04N 21/258* (2011.01)
*H04N 21/262* (2011.01)
*H04N 21/81* (2011.01)

(52) U.S. Cl.
CPC ..... *H04N 21/26283* (2013.01); *H04N 21/482* (2013.01); *H04N 21/8173* (2013.01)

(58) Field of Classification Search
USPC .......................................................... 725/5
See application file for complete search history.

(56) References Cited

U.S. PATENT DOCUMENTS

| | | | |
|---|---|---|---|
| 6,769,127 B1 | 7/2004 | Bonomi et al. | |
| 6,925,469 B2 | 8/2005 | Headings et al. | |
| 7,305,696 B2 | 12/2007 | Thomas et al. | |
| 7,434,242 B1 | 10/2008 | Goode | |
| 7,685,265 B1* | 3/2010 | Nguyen ............... | G06F 9/542 709/223 |
| 7,725,357 B2 | 5/2010 | Gagnon et al. | |
| 8,122,477 B1 | 2/2012 | Stepanian | |
| 8,200,519 B2 | 6/2012 | Moel | |
| 8,280,982 B2 | 10/2012 | La Joie et al. | |
| 8,302,136 B2 | 10/2012 | Buehl et al. | |
| 8,561,109 B2 | 10/2013 | Asbun et al. | |
| 8,661,472 B1* | 2/2014 | Kardatzke ............ | H04N 21/482 725/48 |
| 8,732,854 B2 | 5/2014 | Cholas et al. | |
| 8,943,170 B2 | 1/2015 | Li et al. | |
| 2003/0040962 A1 | 2/2003 | Lewis | |
| 2004/0158529 A1 | 8/2004 | Bray et al. | |
| 2004/0168184 A1 | 8/2004 | Steenkamp et al. | |
| 2005/0055261 A1 | 3/2005 | Esty et al. | |
| 2005/0060748 A1 | 3/2005 | Berman et al. | |
| 2006/0130113 A1 | 6/2006 | Carlucci et al. | |
| 2006/0221882 A1* | 10/2006 | Jung .................... | H04H 20/38 370/312 |
| 2007/0077921 A1* | 4/2007 | Hayashi ................ | H04L 67/26 455/414.1 |
| 2007/0107019 A1 | 5/2007 | Romano et al. | |
| 2007/0217436 A1 | 9/2007 | Markley et al. | |
| 2008/0070548 A1 | 3/2008 | Cha et al. | |
| 2008/0071633 A1 | 3/2008 | Ozkan et al. | |
| 2008/0155618 A1 | 6/2008 | Grady et al. | |
| 2009/0171711 A1 | 7/2009 | Sandoval et al. | |
| 2010/0114783 A1 | 5/2010 | Spolar | |
| 2012/0008786 A1 | 1/2012 | Cronk et al. | |
| 2012/0216225 A1 | 8/2012 | Britt | |
| 2013/0268973 A1 | 10/2013 | Archibong et al. | |
| 2014/0006951 A1* | 1/2014 | Hunter .................. | H04H 60/31 715/719 |
| 2014/0109144 A1 | 4/2014 | Asnis et al. | |
| 2014/0280878 A1 | 9/2014 | Hardin et al. | |
| 2014/0282851 A1 | 9/2014 | Miller et al. | |
| 2015/0033124 A1 | 1/2015 | van Hoff et al. | |
| 2015/0033265 A1 | 1/2015 | Howard, Jr. | |
| 2015/0040173 A1 | 2/2015 | Panagos et al. | |

OTHER PUBLICATIONS

Coppejans, M., et al., "Bundling in Cable Television: Incentives and Implications for Regulatory Policy", manuscript, Department of Economics, Duke University, Oct. 13, 1999. http://www.nber.org/Franco_American/crawford.pdf.

Crawford, G. S., "The Discriminatory Incentives to Bundle in the Cable Television Industry", Department of Economics, University of Arizona, Apr. 2, 2004. http://citeseerx.ist.psu.edu/viewdoc/download?doi=10.1.1.200.2665&rep=rep1&type=pdf.

Kleder, M., "Give Us Cable Choice for Decency's Sake!", CWA, (Last accessed Feb. 20, 2015). http://www.cwfa.org/images/content/cwacablechoice.pdf.

Marchese, L, "CATV in Central Appalachia: A Feasibility Study", Interim Report sponsored by Appalachian Regional Commission, Appalachian Adult Education Center, Morehead State Univ., KY, 1971. http://files.eric.ed.gov/fulltext/ED053380.pdf.

International Search Report and Written Opinion dated Aug. 5, 2016 for PCT Application No. PCT/US16/41794, filed on Jul. 11, 2016.

International Preliminary Report on Patentability dated Jun. 15, 2017 for PCT Application No. PCT/US16/41794, filed Jul. 11, 2016.

* cited by examiner

METHOD AND APPARATUS FOR MANAGING PROVISION OF MEDIA PROGRAMS DIRECTLY FROM CONTENT PROVIDERS

CROSS-REFERENCE TO RELATED APPLICATIONS

This application is a continuation of Ser. No. 15/653,392, entitled "METHOD AND APPARATUS FOR MANAGING PROVISION OF MEDIA PROGRAMS DIRECTLY FROM CONTENT PROVIDERS," by David B. Wertheimer et al., filed Jul. 17, 2017, issued Jul. 10, 2018 as U.S. patent Ser. No. 10/021,441, which application is a continuation of U.S. Utility patent application Ser. No. 14/795,638, entitled "METHOD AND APPARATUS FOR MANAGING PROVISION OF MEDIA PROGRAMS DIRECTLY FROM CONTENT PROVIDERS," by David B. Wertheimer et al, filed Jul. 9, 2015, issued Jul. 18, 2017 as U.S. Pat. No. 9,712,856; both of which applications are hereby incorporated by reference herein.

BACKGROUND OF THE INVENTION

1. Field of the Invention

The present invention relates to systems and methods for providing media programs for consumption by consumer, and in particular to a system and method for managing the provision of media programs directly from content providers.

2. Description of the Related Art

The provision of media programs to consuming users has been the subject of continuing improvement and change. Initially, media programs were provided by local broadcast television services from a limited number of sources to televisions in consumer households. These media programs were few in number (as the radio frequency bandwidth allocated for this purpose was limited), and media programs were only available from local transmitters, which may be operated by network affiliates of national television services or local television providers.

Later, media programs became available from service providers using devices known as set-top-boxes (STBs) in customer's homes. Such service providers include, for example, DIRECTV, DISH, and TIME WARNER CABLE. These service providers provide media programs ultimately obtained from content providers (such as SHOWTIME, HBO, DISCOVERY, and FX). Typically, the service provider charges it's subscribers a fee, and uses these fees to pay the content providers providing the underlying media programs.

With the advent of video compression technology and widespread availability of high-bandwidth transmission of data via the Internet (even wireless transmission to mobile devices such as smartphones), media distribution channels evolved to include transmission by the Internet. Such distribution can be provided according to a number of different service paradigms.

First Paradigm: Access Via the Service Provider Using a Service Provider Application In a first paradigm, the user either accesses a website managed by their service provider (or in the case of a mobile device, downloads an application provided by their service provider (hereinafter, the service provider application), and the user uses that website or service provider application to view the desired media program. Typically, the user must enter their service provider credentials (e.g. username and password) to log into the service and permit the transmission of the media programs.

In this paradigm, the media programs are presented in the context of and within the television service provider application. One example of this paradigm is the user downloading and installing an application from TIME WARNER CABLE TELEVISION, and using this application to view the FOX network show "AMERICAN IDOL." In this paradigm, the television service provider ultimately controls the user experience, including what the user views on their device, how it is presented, how the presentation of the media program is controlled. Accordingly, the user remains in the environment of the television service provider.

For example, if the television service provider finds it advantageous, they may refer the user to another media program from a different content provider once the viewed media program has completed. Importantly, the service provider remains in control of the content delivery and graphical user interface (GUI), and therefore the content provider has no ability to shape or influence the user's viewing experience or interface.

Second Paradigm: Access to Media Programs Directly Through Content Provider

The second paradigm permits the user to obtain the media program directly from the content provider. In this paradigm, the user does not install the television service provider application, but rather, simply goes to a web-site or accesses an application associated with the media program (or series' of media programs) maintained by the content provider. One example of this paradigm is the user downloading and installing an application from FOX, and using this application to view the FOX network show "AMERICAN IDOL."

In this paradigm, the content provider remains in control of the content delivery and user interface, and therefore, conversely of the first paradigm, the customer's relationship is maintained primarily with the content provider and not the television service provider. The content provider may direct the user to additional media programs available from the same content provider and, additionally, the user is not provided with any kind of a program guide or means of navigating media programs available from other content providers.

Since the content provider's media programs are not typically provided free of charge, the user typically must provide some kind of credential that adequately proves they are paying for the right to access the media program. If the user is a subscriber to a subscription of a service provider that includes access to the media program (or more typically, all of the media programs from that content provider), the user may provide their service provider credentials after which, the desired media program is provided to the user via the web-site or playback application. If the user does not have a subscription to a service provider based service, they may otherwise pay for access to the desired media program.

In some cases, media programs provided by this paradigm do not require user credentials or payment. Instead, the content provider may limit access to programs which are not current, or may include advertising (or additional advertising) in the provided content.

This paradigm is increasingly popular among younger viewers, who are typically more computer savvy and are less apt to pay for a subscription from a service provider.

Third Paradigm: Third Party Service Providers Transmitting Via the Internet

Still another paradigm is that of third party television service providers that use the Internet or similar means for transmission of the media programs. Examples of this paradigm include NETFLIX and HULU. Such third parties transmit media programs to users, but such media programs are presented by plugins, web-sites or other applications developed, managed, and controlled by the service provider. Like the first paradigm, the content providers have little control over the presentation of the media program, and following presentation of the media program, the content provider will may have no further contact with the user, because the user is not a direct customer of the content provider, but rather, the television service provider, and the service provider's application is controlling the presentation of the media program.

Other Paradigms: On-Line Program Guides and Password Managers

Still another paradigm is that of online program guide providers. Such providers, provide an online program guide of media programs available from content providers. However, such guides do not operate as a subscription manager, as they do not arrange for subscriptions with content providers. Further, once users select such programs from the program guide, they are referred to the content provider's website and must enter suitable credentials (e.g. from the user's service provider), or download the application/plugin to view the program directly from the content provider.

A final paradigm is what amount to password managers that provide a user that has already subscribed to multiple different content providers (each with different credentials) a way of managing such credentials. Such services do not obtain subscriptions for the user, and they use multiple credentials.

One important factor for a successful service provider is how well they retain viewers during and after media program viewing. Such retention permits the sale of more advertising and increases interest in the media programs offered by the service provider. However, content providers also find it beneficial to steer viewers to watch more media programs from the same or affiliated content provider, and the content provider's ability to do this is severely limited when the user is viewing the media program using the service provider's application. For example, the FOX network may want to expose viewers of AMERICAN IDOL to another FOX program such as SO YOU THINK YOU CAN DANCE. If the user viewed AMERICAN IDOL using a service provider's application (or on the service provider's website) instead of the FOX application or website, the FOX network can do little to attract the use to view any other FOX programs.

Additionally, as described above, customer behavior in relation to the television industry is evolving rapidly. Many customers are now opting to eliminate their paid subscriptions to traditional television service providers (e.g. cable and satellite) and are relying on other, sometimes illegal, means of acquiring television content. These "cord-cutting" consumers would benefit from an alternative and convenient means of gaining access to media programs delivered via content provider web-sites or applications without the requirement of maintaining a traditional television service provider subscription, while still having a single credential that can be used by the content providers to authenticate the customer.

What is needed is subscription management service that obtains and manages access to media programs offered by multiple content providers, provides a single interface for navigating program content and allows the user to select the program, but uses only content provider applications executing on the user device to present media programs, thus irretrievably referring the user to the content provider. This disclosure describes a system and method for managing a subscription to a plurality of content providers and the irretrievably referring users to an interface of the content provider to directly consume media programs provided by the content providers is disclosed.

SUMMARY OF THE INVENTION

To address the requirements described above, the present invention discloses a method and apparatus for providing a media program of a plurality of media programs to a user device directly from a selected content provider of a plurality of content providers via a content provider playback application executed by the user device, wherein the playback application is provided and maintained by the content provider of the media program. In one embodiment, the method comprises receiving a registration request having registration information from a user device in a subscription management service, the registration request to subscribe the user to the selected content provider providing the media program; subscribing the user to the selected content provider providing the media program; receiving a playback request from the user device, the playback request comprising a user selection of the media program from the selected content provider for playback exclusively by the content provider playback application executed by the user device, the content provider playback application provided to the user device and maintained by the selected content provider of the media program; irretrievably passing control of the user device GUI to the selected one of the content providers to receive and play back the media program from the selected content provider via the content provider playback application; and enabling playback of the media program from the selected content provider only by the playback application executed by the user device only if the user is a subscriber to the selected content provider.

Another embodiment is evidenced by an apparatus for performing the above processes.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
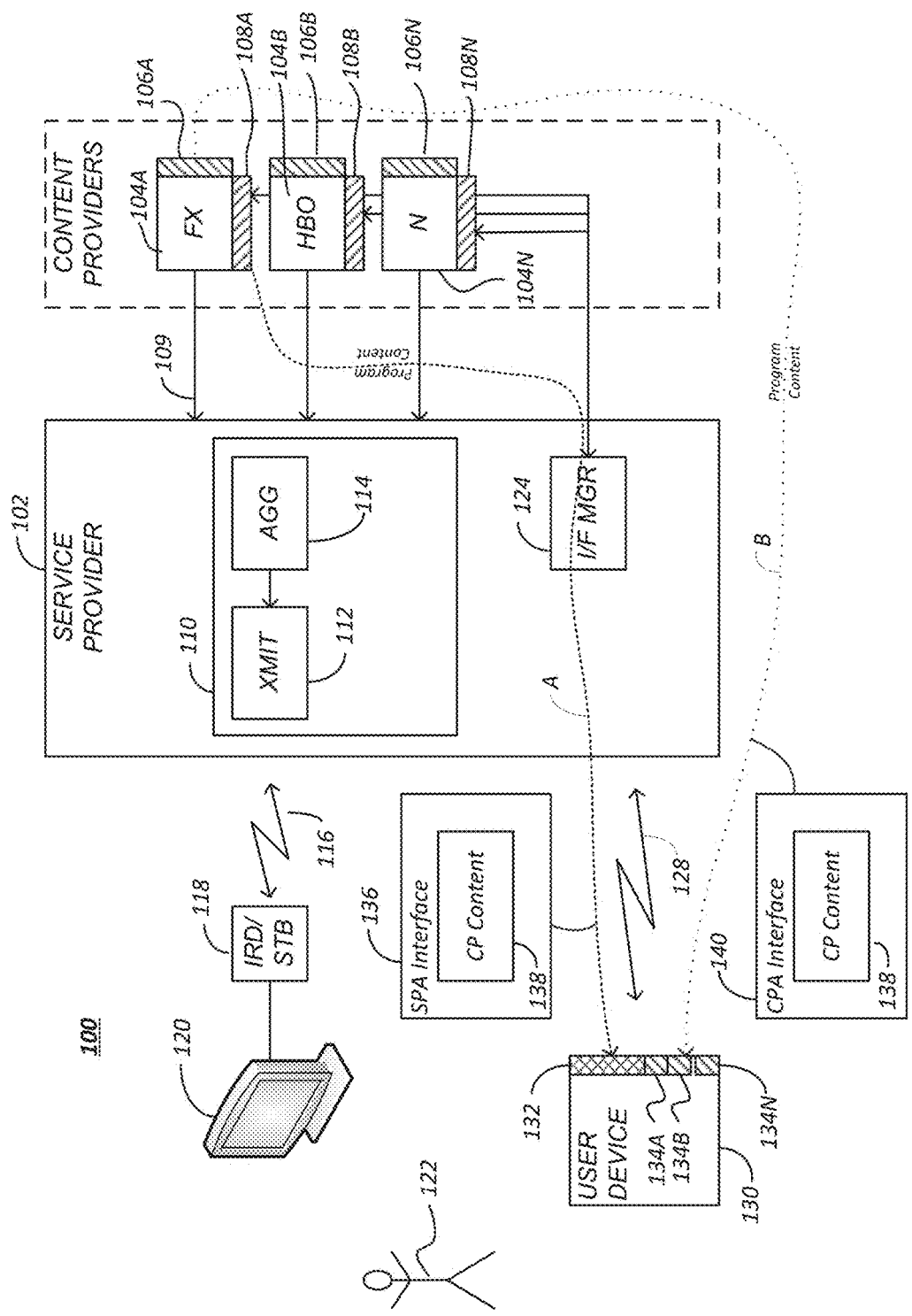
FIG. 1 is a diagram illustrating an exemplary prior art content delivery system.

FIG. 1 is a diagram illustrating an exemplary prior art content delivery system (CDS) 100. The CDS 100 comprises one or more (N) content providers 104A-104N (e.g. FX, HBO, etc., hereinafter alternatively referred to as content provider(s) 104), who each provide one or more media programs for viewing by users 122. Typically, the content providers 104 either produce the media programs provided or contract with other content providers, such as movie studios and the like) to obtain the rights to copy and distribute such media programs to users 122 for a fee. In a typical CDS 100, the content providers 104 provide the content to the users 122 via one or more service providers 102, such as TIME WARNER cable, or DIRECTV. The service provider 102 contracts with one or more content providers 104, paying fees to those content providers 104 to obtain feeds 109 of the media programs, so that such feeds 109 can be distributed to users 122. The provision of such media programs to users 122 is typically premised on a fee paid to the service provider 102 by the user 122 for such services.

The service provider 102 may provide the media programs to users 122 by two paradigms.

Content Access Through Service Provider Applications/Interfaces

In the first paradigm, the transmission is a 1-to-N broadcast transmission via a first communications link 116, wherein N comprises at least a substantial subset of the subscribing users 122. Such broadcast transmission may be accomplished via terrestrial, satellite, or cable means. In the second paradigm, transmission is a point to point transmission via second communications link 128. Typically, this transmission is a one-to-one transmission accomplished via the Internet, but may also be a 1-to-M transmission wherein M<<N, for example, by multicasting.

Transmission of media programs via the first paradigm using the first communication link 116 are affected by broadcast transmission system 110, which includes an aggregator 114 to assemble the media content streams received from the content providers 104 into one or more service provider streams that are transmitted wirelessly or by wire using transmitter 112. The streams or signals transmitted by the transmitter are received by consumer premises equipment (CPE) such as integrated receiver/decoder (IRD) or set-top-box (STB) 118. Typically, the STB 118 is provided to the user 122 for installation on the user's premises as a part of the user's 122 subscription to the services provided by the service provider 102. The STB 118 receives the media program(s) in streams of data, and process that data to recover a video signal of the desired media program(s) and present the recovered video signal on a display 120 or analogous device communicatively coupled to the STB 118.

Transmissions via the second paradigm by the second communications link 128 are effected by an interface manager 124 which accepts media programs from the content providers 104, and processes them for transmission by second communication link 128 (typically, the Internet) for presentation via a service provider playback application 132 installed on the user device 130. Each content provider 104A-104N may include a respective service provider interface application (108A-108N) that interfaces with the interface manager 124 to respond to media program requests.

Typically, the service provider playback application 132 accepts the media programs and other content received from the content providers 104A along with any service provider-provided data added by the interface manager 124, and presents the media programs or content from the content provider 104 and data within the context of the service provider application (SPA) 132 interface 136. For example, a window may be presented within the SPA interface 136 presenting the CP content 138, or the SPA interface 136 may be replaced with a tab or another browser window having the CP content, while retaining the SPA interface 136 on another tab. However, in either case, the user 122 retains the ability to quickly and easily return to the service provider playback application 132, and thus, the user 122 experience remains in the control of the service provider 102.

Content Access Through Content Provider Applications/Interfaces

In the second paradigm, users 122 may also obtain media programs directly from the content providers 104 (e.g. without any interaction with the service provider 102) also using, at least in part, communication link 128.

Authorization Via Service Provider Credentials:

In a first case, this may be permitted because the service provider 102 offers the user device 130 the ability to receive media programs from the content provider 104 in mobile devices as a part of the user's 122 subscription package. In this case, access to the desired media program may be provided by the user device 130 contacting the content provider 104 of the media program of interest directly rather than via the service provider 102, for example, using a generic web browser by entering the URL of the content provider 104 or accessing the content provider application 134. To assure that the user 122 is authorized to receive the desired media program from the content provider 104, the user 122 is typically prompted to enter credentials demonstrating that they are a subscriber to the desired media program (by virtue of their service provider 102 subscription) and/or its related content provider 104.

The interface in which the credentials are entered may be provided by the service provider 102 (e.g. a dedicated URL or application 132 of the service provider 102) or provided by the content provider 104 (e.g. a URL or application 134 of the content provider 104). The user 122 enters their credentials, and the user device 130 transmits the credentials to the appropriate service provider 102 or content provider 104.

In one embodiment, the credentials are entered into the content provider's website or application 134, and provided to the service provider 102 for validation. The service provider 102 may then indicate whether the user's credentials are valid by transmitting an appropriate message to the content provider 104. If the credentials are indicated as valid, the content provider 104 may then provide the requested media program or service to the user 122. In another embodiment, instead of entering the user's credentials into the content provider's website or application 134, the user is referred to the website or application 132 of the service provider, where the credentials can be entered without exposing them to the content provider 104. A message indicating that the credentials are valid or not may then be sent to the content provider, again, without compromising the security of the credentials.

The user's credentials are analyzed and used to determine whether the user 122 is entitled to receive the requested media program. If the credentials indicate that the user 122 is entitled to receive the requested media program, the content provider 104A-104N provides the media program for playback on the user device 130, using an associated content provider playback application 134A-134N provided to the user device 130 and maintained by the selected content provider 104A-104N of the media program. If no such application is installed, the content provider 104 may provide the content provider playback application 134 to the user device 130 for installation. This may be accomplished directly or via a third party service such as APPLE's APP STORE. Each of the content providers 104A-104N may also include an associated content provider interface application 106A-106N that interfaces with the associated content provider playback application 134A-104N to appropriately format the media program for transmission over the second communication link 128 and to manage and control such transmission and respond to user 122 commands to the user device 130 controlling such playback.

Authorization Via Non-Service Provider Credentials:

In the second case, the desired media program may be provided because the user 122 has subscribed to the content provider 104 of the desired media program independent of any relationship with a service provider 102. In this embodiment, the user 122 enters their credentials into the user device 130 and transmits the credentials to the content provider 104. However, in this embodiment, the content provider 104 itself can confirm that the requesting user 122 is a subscriber of the content provider 104, and if not, offer a subscription to the user 122.

To exemplify the foregoing examples, consider a service provider 102 that has contracted with content provider FX 104A for media programs including SONS OF ANARCHY episodes. Further suppose that a user 122 that subscribes to the services provided by the service provider 102 (that include FX) desires to view an episode of SONS OF ANARCHY. The user 122 may ordinarily receive the episode in their home using an STB 118 installed in their home. But if the user 122 is in a location remote from the STB 118 such as a second home that does not have an STB 118, the user 122 may still obtain access to the episode by downloading and installing the SPA 132 in a remote user device 130 such as a laptop, tablet or cellphone, and gain access to the content via signal path "A." Should the user 122 prefer to receive the episode directly from the FX 104A, the user 122 may install the CPA 134 provided and maintained by FX 104A on the user device 130, and attempt to receive the episode directly from FX 104A using the CPA 134.

Further consider a user 122 that does not subscribe to the services provided by service provider 102. That user 122 may still obtain access to a desired media program from a content provider 104 directly through the content provider 104. This may be the case if the content provider 104 permits or encourages individual subscriptions. Such access may be provided in the home or remotely, by use of the CPA 134 executing on the user device 130.

Improved Content Delivery System Using

Independent Subscription Management Service

Figure 2:
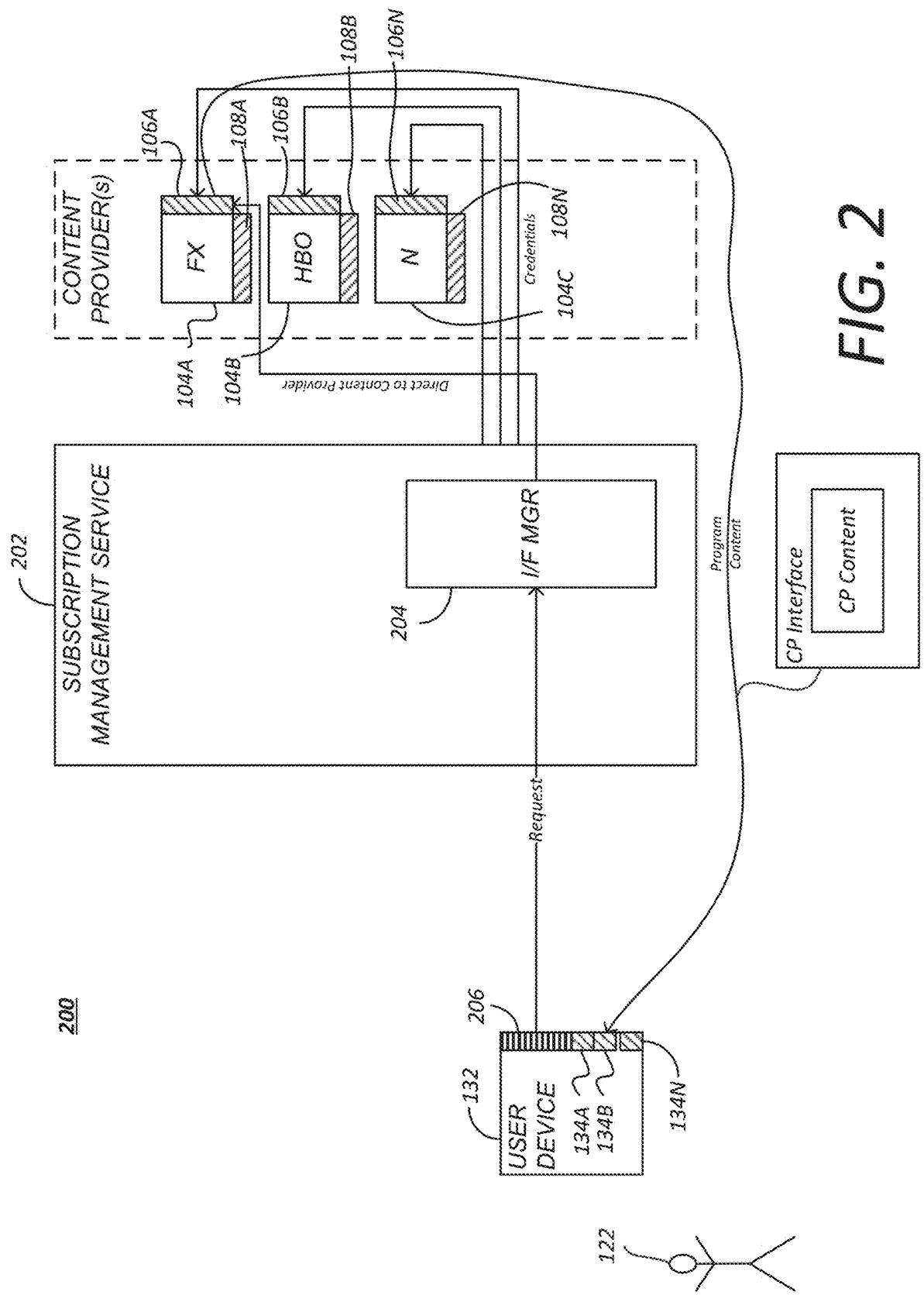
FIG. 2 is a diagram of an alternate content delivery system that utilizes a subscription management service instead of a service provider.

FIG. 2 is a diagram of an alternate CDS 200 that utilizes a subscription management service (SMS) 202 instead of a service provider 102. The SMS 202 comprises an interface manager 204 that interfaces between a plurality of content providers 104A-104N and a subscription management service application (SMSA) 206 that may be executed by the user device 130. FIG. 2 is discussed below in connection with the operations and interfaces shown in the remaining figures.

Figure 3:
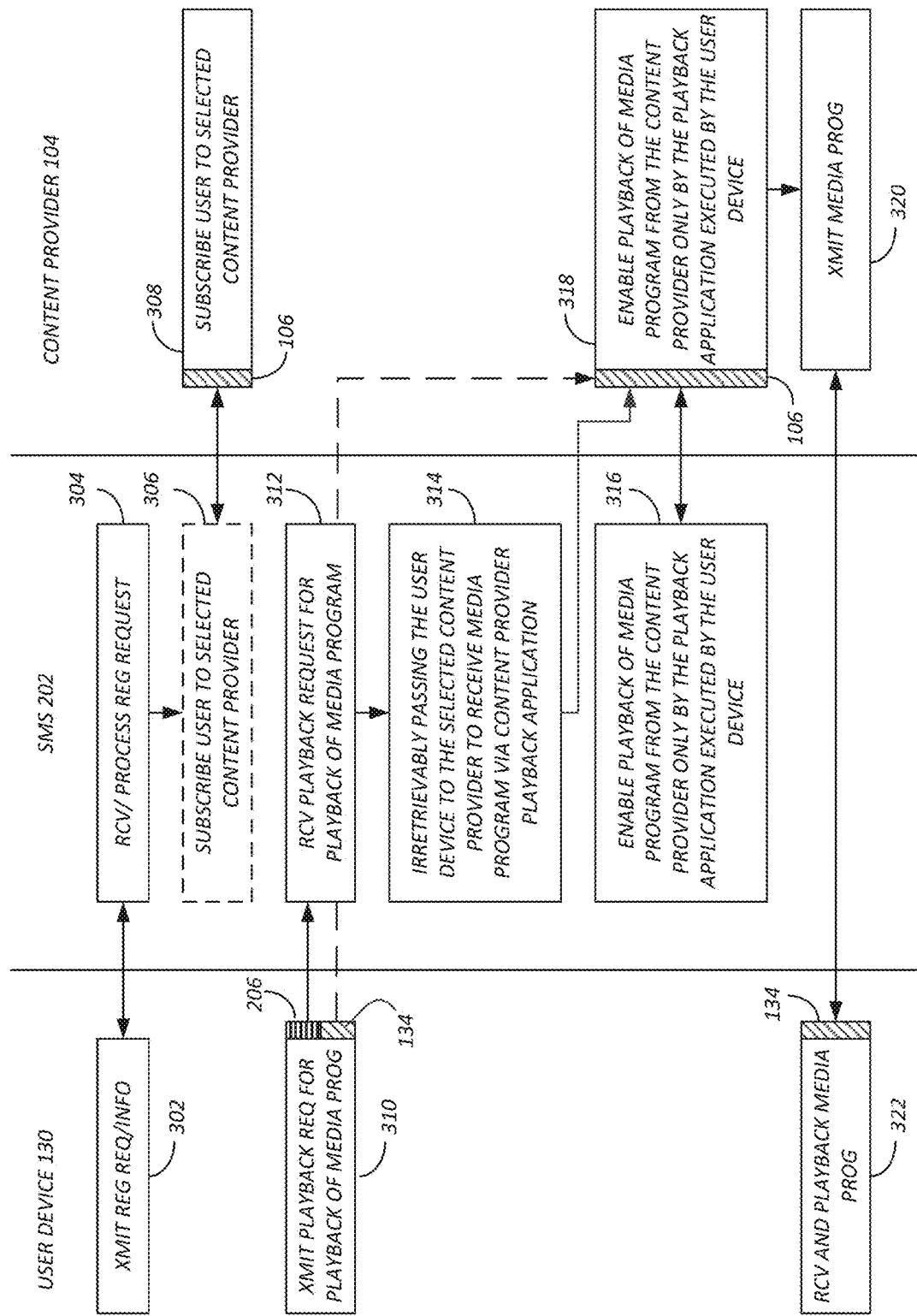
FIG. 3 is a diagram illustrating one embodiment of exemplary processes steps that can be used to provide media programs using the subscription management service.

FIG. 3 is a diagram illustrating one embodiment of exemplary processes steps that can be used to provide media programs using the SMS 202. In block 302, the user device 130 transmits a registration request to the SMS 202. This can be accomplished by using a web browser executing on the user device 130, to access a "sign up" webpage hosted by the SMS 202, and entering information in input fields of that webpage that can be used by the SMS 202 to identify the user 122 in the future, and to obtain payment for the provision of services.

Figure 4:
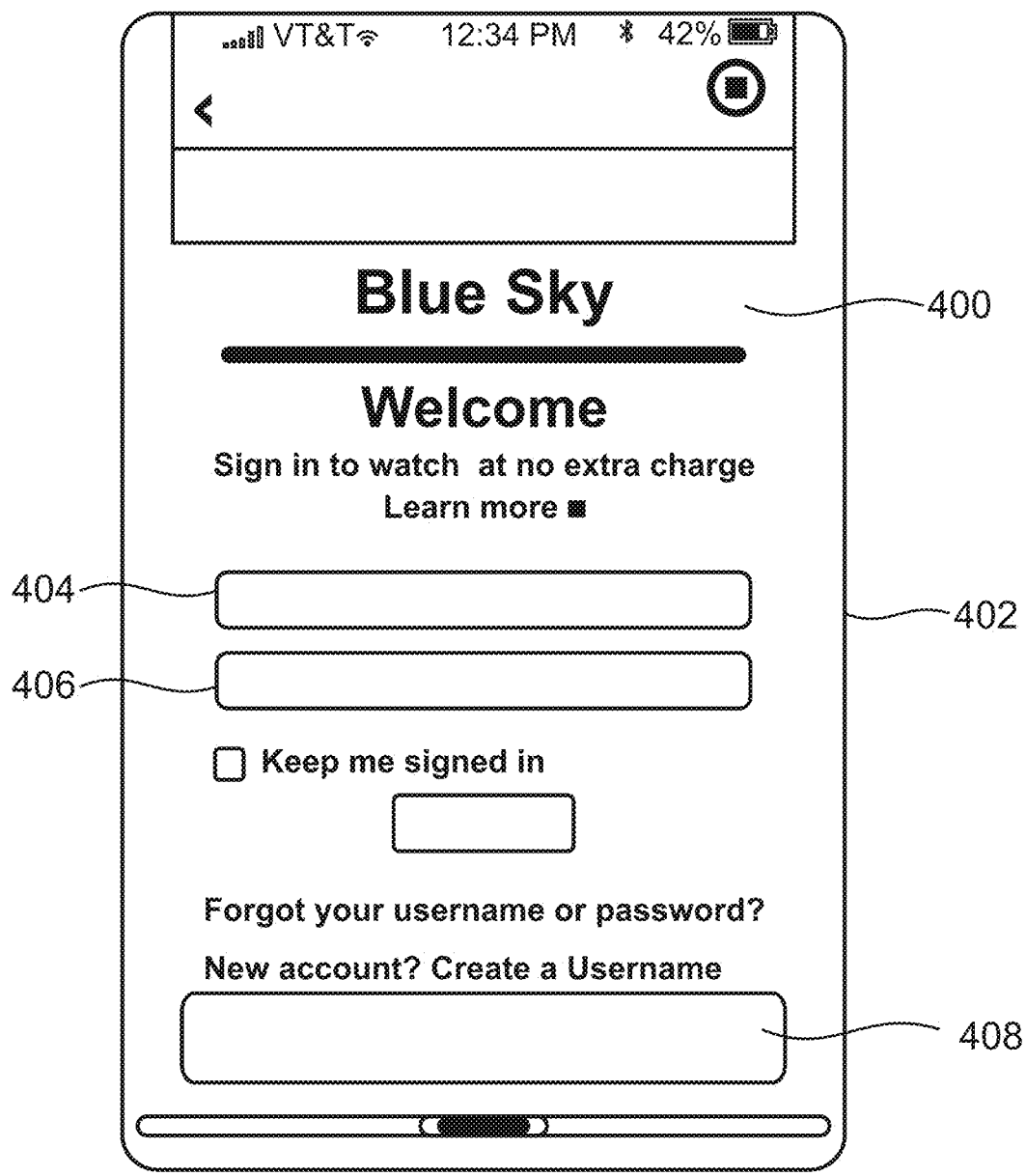
FIG. 4 is a diagram illustrating one embodiment of an exemplary user interface for transmitting a registration request to the subscription management service or for logging an already registered user into the subscription management service.

FIG. 4 is a diagram illustrating one embodiment of an exemplary user interface 400 for transmitting a registration request to the SMS 202. The interface 400 includes a first interface portion 402 in which a user 122 who has already registered with the SMS may log in using previously supplied credentials. Such credentials can include, for example, a user identifier (such as a username or email address), and a password, which can be entered in form inputs 404 and 406, respectively. New (currently unregistered) users 122 may enter a proposed username or ID in form input 408, and be prompted for a password, followed by a process to accept payment from the user 122.

As shown in block 304, the SMS 202 receives and processes that registration request. Following registration, the user 122 may obtain access to the SMSA 206 for installation on the user device 130. In one embodiment, the SMSA 206 is transmitted directly from the SMS 202 to the user device 130, but the SMSA 206 may preferably be transmitted via a third party such as the APPLE's APP STORE.

In another embodiment, registration is accomplished by prompting the user 122 to navigate to another "sign up" webpage of the SMS 202, and entering other information in the input fields of that webpage. Such information may comprise a telephone number of a smartphone presenting the "sign up" webpage to the user 122 and a credit card number. The SMS 202 then receives the information, verifies that the telephone number of the user 122 matches the credit card number provided and that the credit card number is authentic and approved, then transmits, via a text message to the smartphone's telephone number, a link (e.g. URL) for only that user 122. This link can be used to download and install the SMSA 206 on their smartphone, either directly or through a third party application manager such as APPLE's APP STORE. This link is unique to each particular user 122 (thus limiting the right to download the application to that user 122), and is preferably active only for a limited period of time.

In one embodiment, the SMSA 206 downloaded and installed on the user device 130 is the same for all users 122 of the SMS 202. However, in a preferred embodiment, the downloaded and installed SMSA 206 is personalized to the user 122, and includes user 122 credentials that are used to obtain media programs and other services from content providers 104, as further described below. Although an email address may be used instead of a smartphone number to authenticate the individual signing up for SMS service, the use of the smartphone number is particularly advantageous, as smartphone numbers are more difficult to obtain anonymously, can be verified, and are less easy to spoof than an email address. Once the SMSA 206 is installed on the user device 130, the user 122 may select their favorite media programs.

If the user 122 has already signed up for the subscription management service, the operations of blocks 302-304 have already been performed, and the user 122 may simply enter their username or ID in input field 404 and password in input field 406 and select "sign in."

Referring back to FIG. 3, after the user 122 is registered, the user may then be presented with an interface by which the user 122 subscribes to particular content providers 104 or media programs provided by those content providers 104. This is illustrated in blocks 306 and 308.

In one embodiment, this is accomplished by presenting an interface to the user 122 to select from a list of available content providers 104. The user 122 makes the selections, and the information is transmitted to the SMS 202. The SMS 202 then contacts the content providers 104 to register the user 122 for the media programs from each selected content provider 104. Preferably, the user 122 is registered to view each content provider's media programs using the same credentials that were used to register or login to the SMS 202, but this need not be the case. Since the content providers 104 require compensation for permitting the user 122 to view their media programs, they may bill the SMS 202, which, in turn, adds the fees for the access to the selected content providers 104 and any related management fees to the account of the user 130 with the SMS 202, so such fees are ultimately paid by the user 122. In this embodiment, the SMS 202 acts as a broker between the user 122 and the content providers 104, allowing user 130 to choose from a cafeteria of content providers 104 as they see fit. In some embodiments, the SMS 202 may provide the user with pre-selected packages of content providers 104, typically at a discounted rate than is available when content providers 104 are selected individually. After such selections have been made and the user 122 is registered with the content providers 104 of interest, they may be directed to an interface to download and install the applications 134 from each selected content provider 104, so that playback may commence. In another embodiment, this is accomplished by presenting a program guide interface to the user 122, providing the user with the opportunity to select media programs of interest. Once such programs are selected, the user may be provided with an interface that allows them to select and download the content provider application 134 to receive the media programs of interest. This embodiment is further illustrated below.

Figure 5:
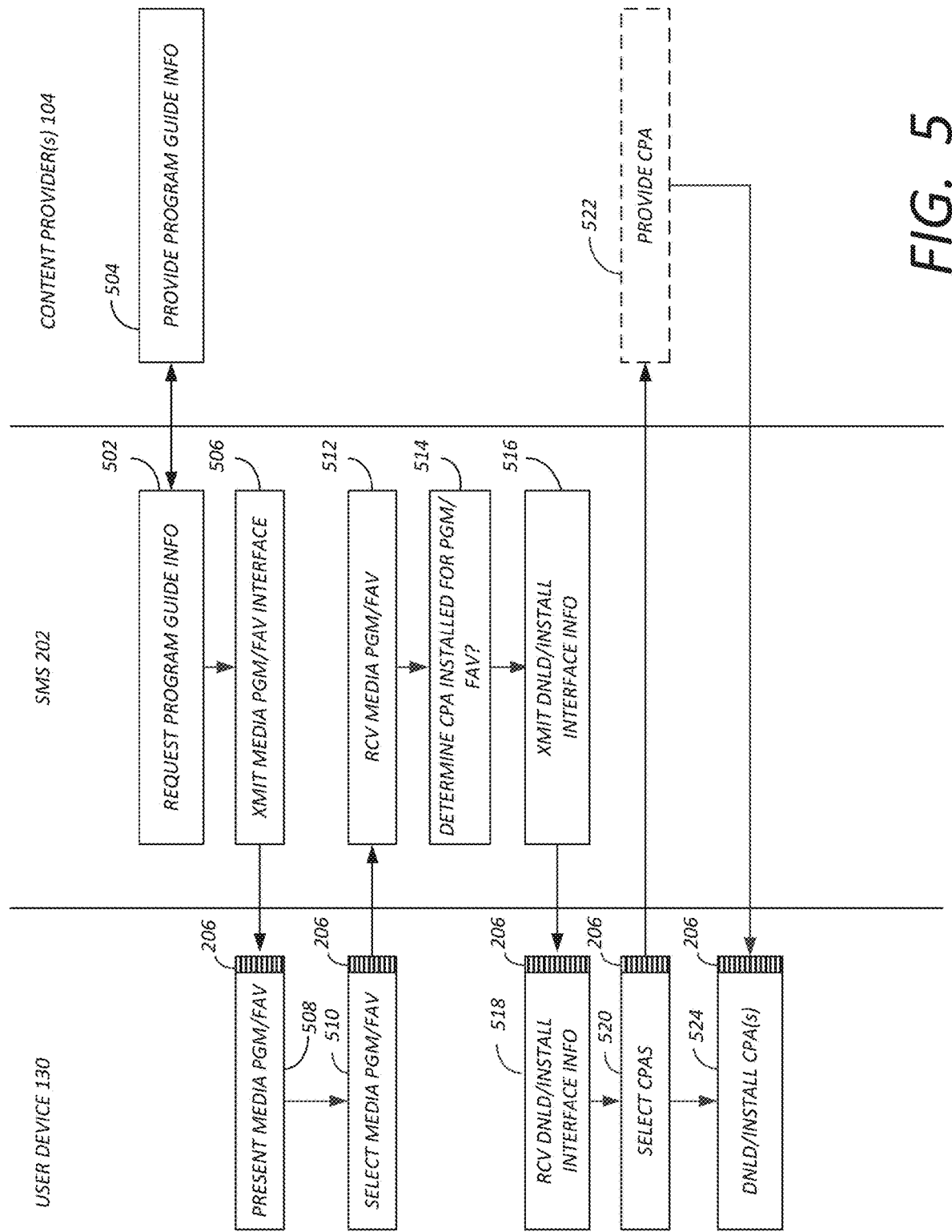
FIG. 5 is a diagram illustrating one embodiment of program guide and favorite selection operations.

FIG. 5 is a diagram illustrating one embodiment of program guide and favorite selection operations. In blocks 502 and 504, the SMS 202 obtains program guide information from the content provider(s) 104, or from a third party service. This typically occurs on a periodic basis, with the SMS 202 continually receiving program guide information and updating its databases so that the information can be transmitted to user devices 130 when needed.

The program guide information includes information regarding the media programs, including which series (if any) the media program is a member of, the content provider 104 providing that media program, when the media program is available from the content provider 104, as well as information regarding the media program itself (e.g. actors, plot).

In block 506, the SMS 202 uses the program guide data to generate a program guide interface that is transmitted to the user device 130. That information is received by the user device 130, and using the SMSA 206, the user device 130 presents such program guide information to the user 122. This permits the user device 130 to offer media programs to the user 122 so that user favorite media programs or TV series' may be selected, and also permits the user device 130 to present a program guide to the user. While FIG. 5 illustrates an embodiment wherein the program guide information is provided to the user device 130 via the SMS 202 (e.g. with the SMS 202 obtaining the program guide information and providing this information to the user device 130), other embodiments are possible in which the user device 130 retrieves (or the content provider 104 pushes) program guide information directly to the user device 130 (e.g. without involving the SMS 202). In block 508, the user device 130 presents the media programs (and if favorites have been selected as a part of the registration process, favorites) to the user.

Figure 6:
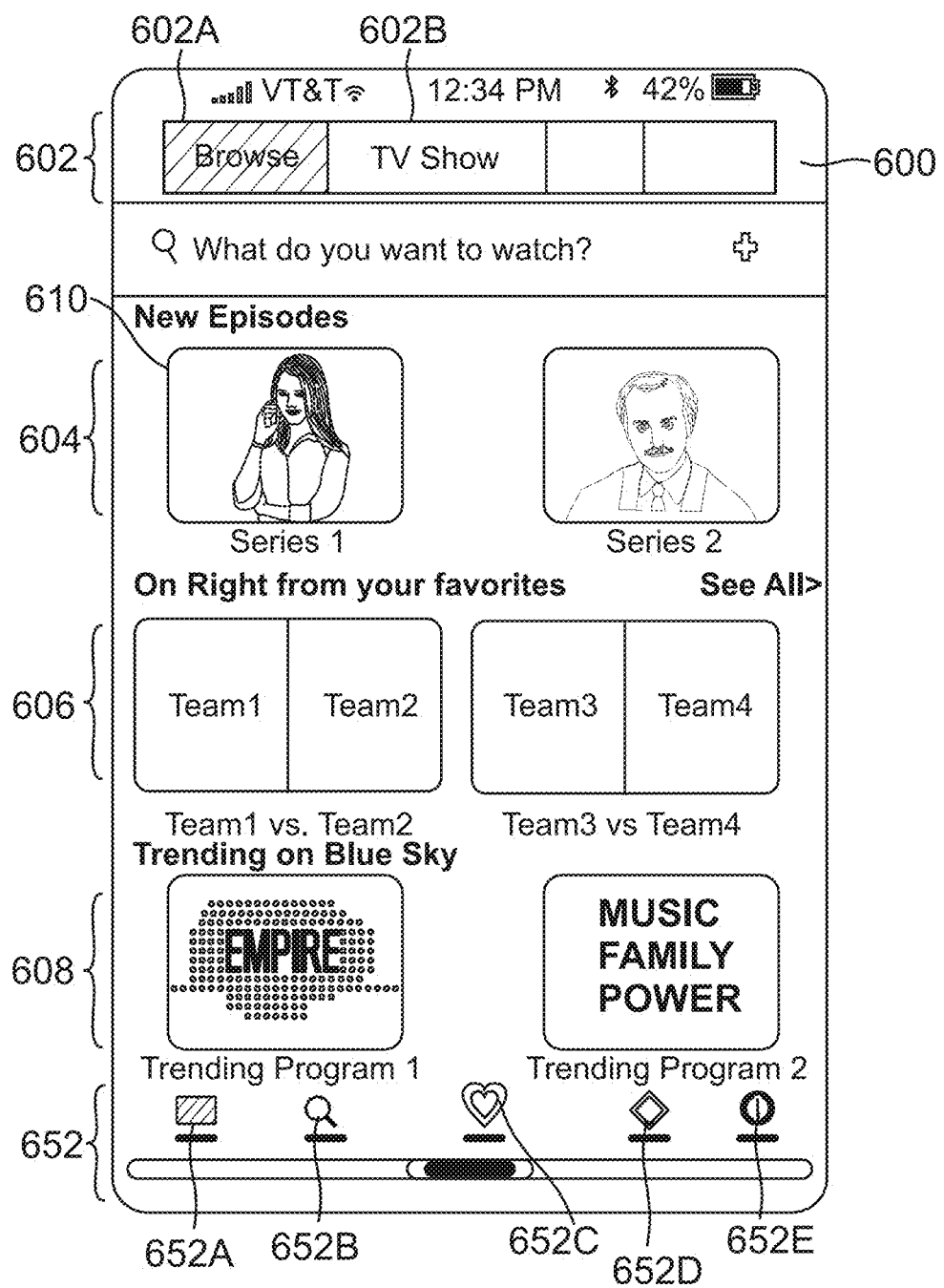
FIG. 6 is a diagram of one embodiment of a user interface home page and program guide provided by the subscription management service application.

FIG. 6 is a diagram illustrating an exemplary embodiment of a displayed home page 600 which includes program guide functionality. The home page 600 interface includes a tab region 602 having a plurality of tabs 602A-602B. Tab 602A is a "browse" tab that, when selected, presents the information and interface illustrated in FIG. 5 below the tab region 602. the Browse Tab 602 is the tab the user 122 would select when they wish to discover new content. Tab 602B is a "TV Show" tab which will be discussed further below.

The home page 600 also includes a navigation bar 652, having navigation controls 652A-652E which are presented in all interfaces of the SMSA 206. Home control 652A navigates the SMSA 206 to the home page illustrated in FIG. 6, and is highlighted because the home page 600 is currently navigated to. Find control 652B navigates the SMSA 206 to present an interface that permits the user to search for and find media programs and other content of interest. Favorites control 652C navigates the SMSA 206 to a favorites interface discussed further below. Application Manager control 652D brings the SMSA 206 to the application manager interface, which allows the user to manage and control the selection, downloading, and installation of content provider applications 134 in one convenient interface, without requiring the user to go to each content provider 104 separately, and download, and install the application from each content provider 104. It also allows the user to download and install multiple content provider applications 134 without re-entering the user's credentials again and again. Recent control 652E navigates the interface to a screen that displays recent media programs and content viewed by the user 122.

At least a portion of the home page 600 is unique to the user 122, as it is generated from user 122 defined "favorites" identified during the registration process and as further defined below. For example, the illustrated embodiment of the program guide 600 interface includes three rows of thumbnails, including a new episode row 604, a live stream row 606, and a trending row 608.

The new episode 604 row presents thumbnails representing new episodes of media program series' that the user 122 has previously indicated are "favorites." Each thumbnail is also a control that allows the user 122 to select the thumbnail and to receive the episode of the media program series and view the episode of the media program series using the CPA 134 from the content provider 104. Once the user 122 has viewed the episode, the thumbnail associated with that episode is either delineated to change its appearance, or removed from the program guide altogether. Accordingly, the home page 600 interface is customized to the user 122 not only in terms of what they have identified as "favorites" but which of those "favorites" they have already seen. Typically, the new episode row presents thumbnails representing media program episodes that are available for download and playback at any time convenient to the user 122.

The live stream row 606 presents thumbnails of media programs that are being live streamed. Although this may include media programs that are an episode of a series, such media programs typically comprise sporting events, concerts, or news events. As before, the user 122 may scroll through the thumbnails representing the media programs with a left-right swiping gesture.

The "trending" row 608 depicts media programs that have amassed a greater portion of general viewership among all users 122 than expected in a recent time interval, thus indicating that the viewing of the media program has become a trend among viewers. This permits the user 122 to identify media programs that they might like to view. In one embodiment, the user's "favorites" are excluded from this row, as the user 122 has already expressed interest in such programs. Further, in different embodiments, which media programs are presented as "trending" is determined by what the user 122 has already viewed or has identified as favorites. For example, if the user 122 has "favorited" a particular media program, another media program that appeals to the same demographic may be either presented or emphasized (e.g. by placement to the left of the row 608).

Returning to FIG. 5, the user 122 selects media program favorites using the program guide interface 600 or favorites interface 700 and this information is used to determine whether a CPA 134 is installed for each "favorited" media program or media program series. This is shown in blocks 510-514.

Figure 7:
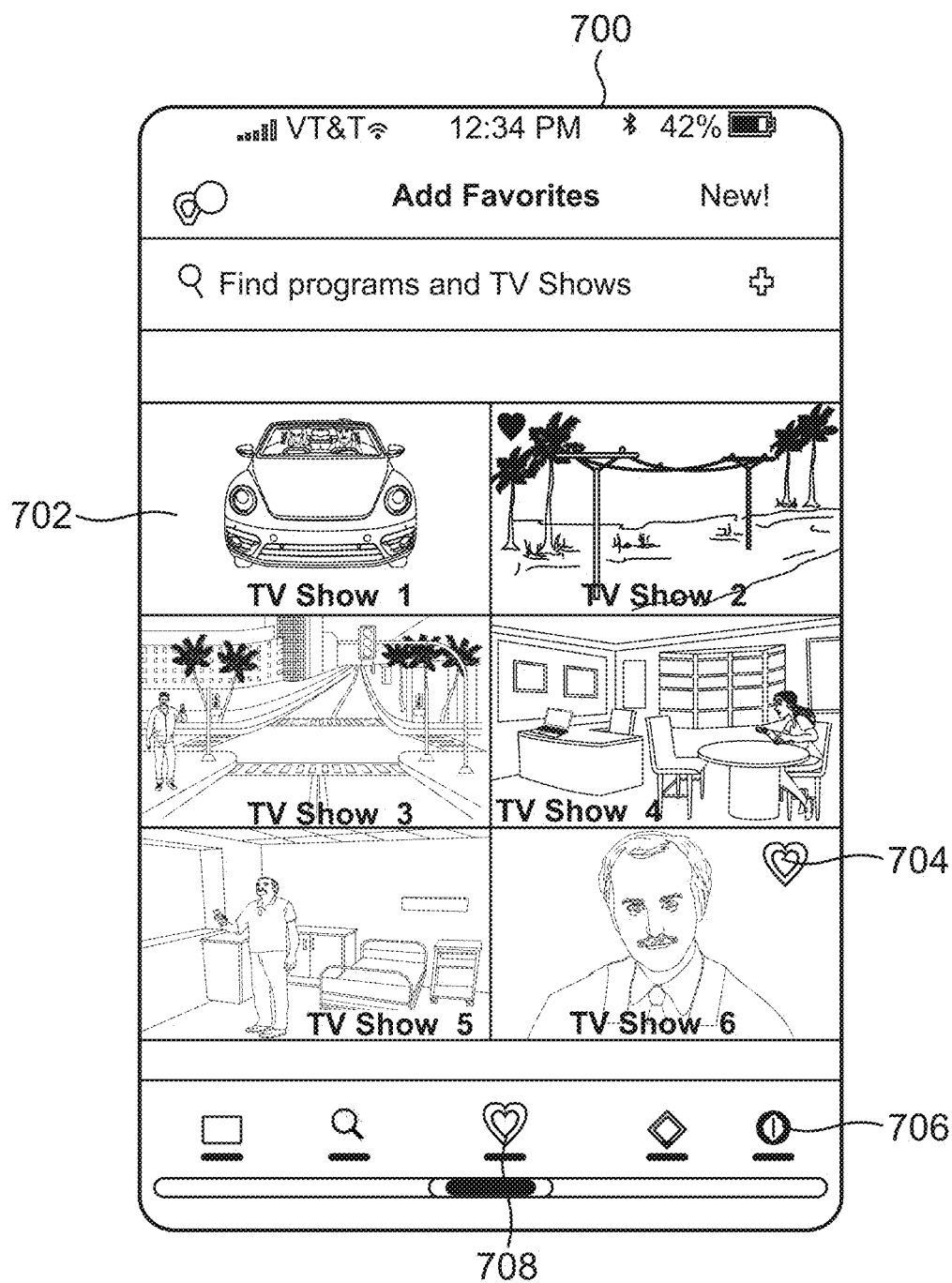
FIG. 7 is a diagram illustrating a user interface for selecting favorite media programs or series.

FIG. 7 is a diagram of one embodiment of a user interface 700 for selecting user favorites selection provided by the SMSA 206. This interface 700 is obtained by selecting navigation control 652C, but may also be automatically presented without user 122 input immediately following the registration process described above or login.

Through this interface, the user 122 can control the user device 130 to designate media programs or series of media programs from a plurality of media programs (or series of media programs) available from content providers 104 associated with the SMS 202 as "favorites." Each media program or series of media programs can be represented by a thumbnail, and the thumbnails can be navigated by appropriate gestures on the screen of the user device 130. In the illustration, the user 122 has navigated to a display that includes a thumbnail 702 for the media program series SONS OF ANARCHY, available from the content provider FX 104A. The display also includes an annunciator 704 indicating that another media program (THE BACHELOR) has already been "favorited."

Figure 8:
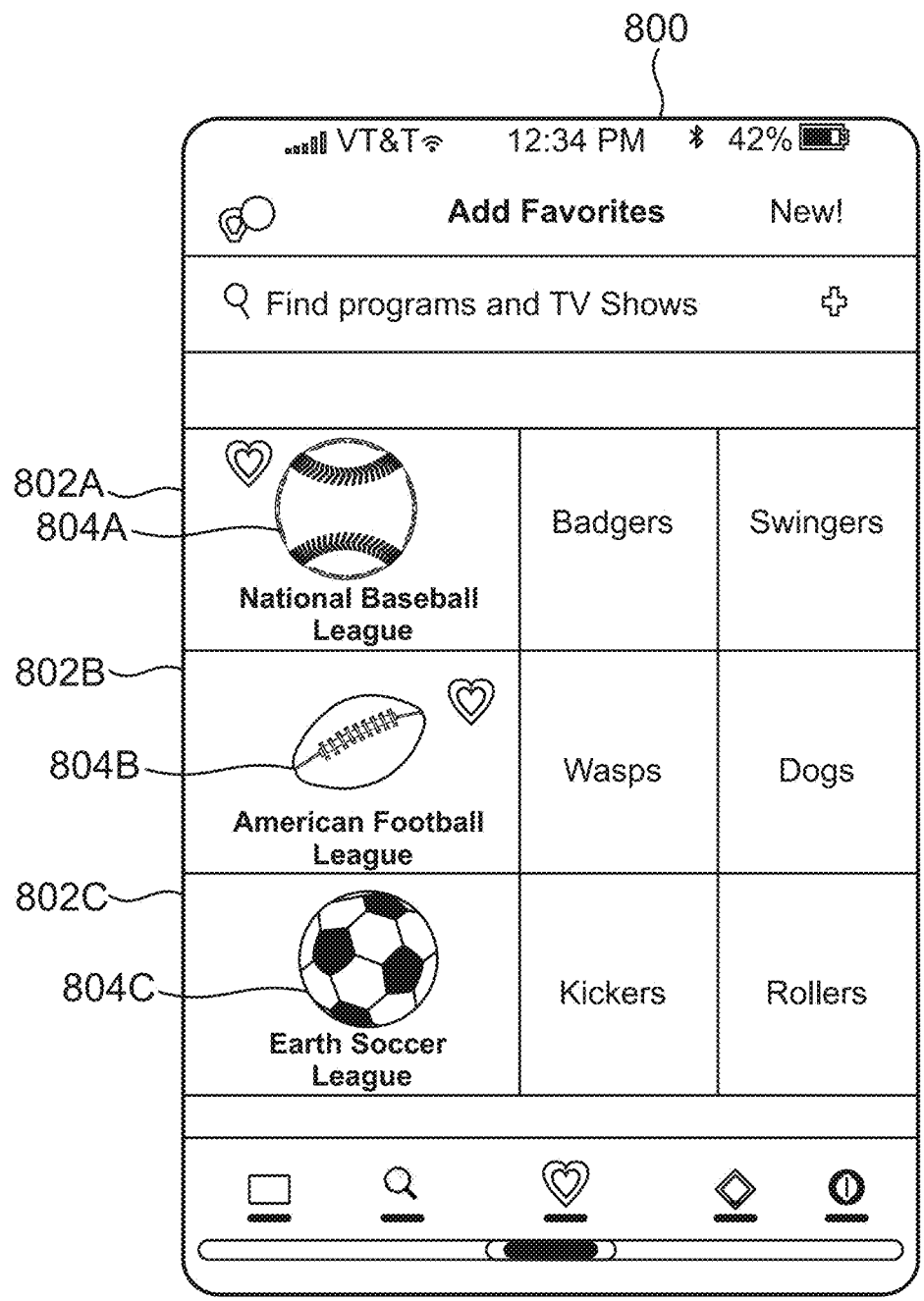
FIG. 8 is a diagram illustrating one embodiment of an interface for selecting sports favorites.

Favorites can also be identified according to genre. For example, FIG. 8 is a diagram of a sports favorites user interface 800 presented in FIG. 8 that presents candidate favorites for sports teams. A first row of thumbnails 802A allows the user 122 to select favorites from among professional football teams, a second row of thumbnails 802B allows the user 122 to select favorites from among professional baseball teams, and a third row of thumbnails 802C allows the user 122 to select favorites from among professional basketball teams. The furthest thumbnail on the left indicates which sport is represented in each row. For example, thumbnail 804A indicates that the other thumbnails in the associated row represent football teams, thumbnail 804B indicates that the other thumbnails in the associated row represent baseball teams, and thumbnail 804C indicates that the other thumbnails in the associated row represent basketball teams. Additional rows of thumbnails for additional sports may be obtained by swipe gesturing up or down, and different thumbnails for different teams may be obtained by swipe gesturing left of right within the desired row 802.

Returning to FIG. 5, in block 516, the SMS 202 transmits CPA 134 download/install information generated from the process illustrated in block 514. This information identifies which CPAs 134 must be installed on the user device 130 in order to view the desired (e.g. favorited or selected) media program or series directly from the content provider 104, and provides a simple and direct interface by which the user 122 may automatically (e.g. without further user input or command) download all such CPAs 134. In block 518, the user device 130 presents the download install information, preferably using a CPA 134 manager interface 900 further described below.

Figure 9:
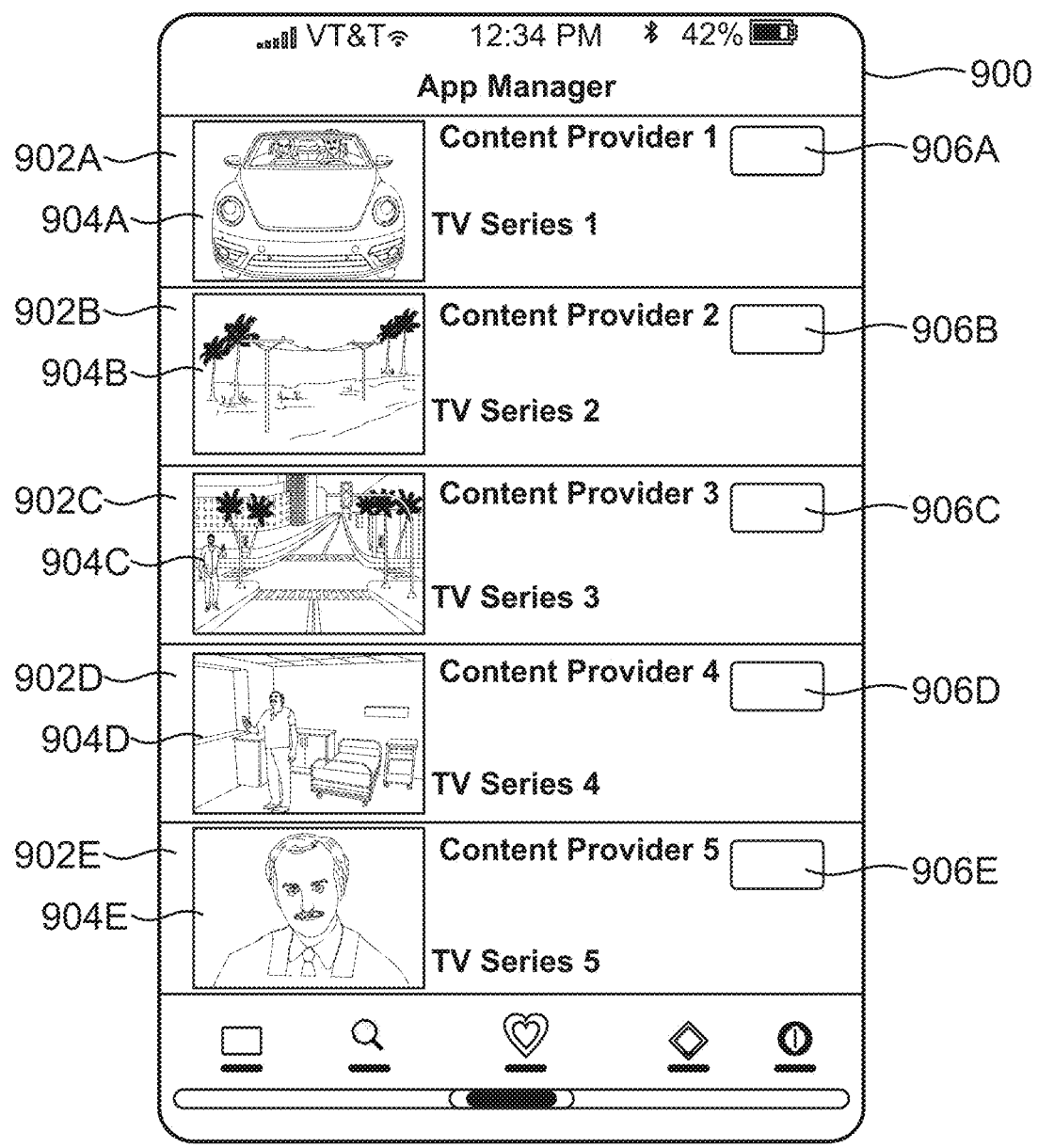
FIG. 9 is a diagram illustrating one embodiment of an exemplary content provider application manager interface.

FIG. 9 is a diagram illustrating one embodiment of an exemplary CPA 134 manager interface 900. The CPA manager interface 900 comprises a plurality of scrollable portions 902A-902E, each depicting a content provider that provides a media program or series that was selected by the user 122 as a "favorite." Each portion 902A-902E may include a respective thumbnail 904A-904E or other depiction of the media program or series that was favorited by the user 122, thus accounting for the presence of that content provider 104 in the CPA manager interface 900. If one content provider 104 provides more than one of the favorited media programs, more than one thumbnail can be provided.

Also provided in each portion 902A-902E are controls 906A-906E that are used to select CPAs 134 to download and install in the user device 130 from each content provider. Optionally, the controls 906A-906E serve the dual purpose of indicating whether the related CPA 134 is already installed on the user device 130. For example, control 906D is shaded/colored to indicate that the CPA 134 needed to obtain and play the media program from the that content provider 104 (in the illustrated embodiment, ABC FAMILY) has been downloaded and installed and need not be downloaded again, while the different shading/coloring of the other controls 906A-906D indicates that these CPAs 134 have not been downloaded and installed on the user device 130.

Returning to FIG. 5, the user 122 selects the CPAs 134 to be downloaded and installed on the user device 130, as shown in block 520. This can be accomplished using controls 906. This information (as well as the user credentials already supplied) may be used to automatically (e.g. without further user 122 interaction to complete the process) download and install all of the selected CPAs 134. This relieves the user 122 of the requirement to individually contact each content provider 104 to download their respective content provider application 134, and enter user credentials each time. In one embodiment, information identifying the requested CPAs 134 are received by the SMS 202, which forwards these requests to the respective content providers 104, along with sufficient information to push the CPA 134 to the user device 130 for installation. For example, a CPA manager module resident in the SMSA 206 may download and install each CPA 134 one at a time, or download and install multiple CPAs 134 concurrently without user 122 involvement, in the same manner as a podcast manager. In other embodiments, the CPA manager is referred to a third party entity such as APPLE's APP STORE.

The selected CPAs 134 to be downloaded may depend on the user device 130 to which they are being downloaded. Accordingly, a control or interface may be presented in conjunction with the interface presented in FIG. 9 whereby the user 122 may select which device (e.g. ROKU, APPLETV, smartphone) they are using with the downloaded application.

Figure 10:
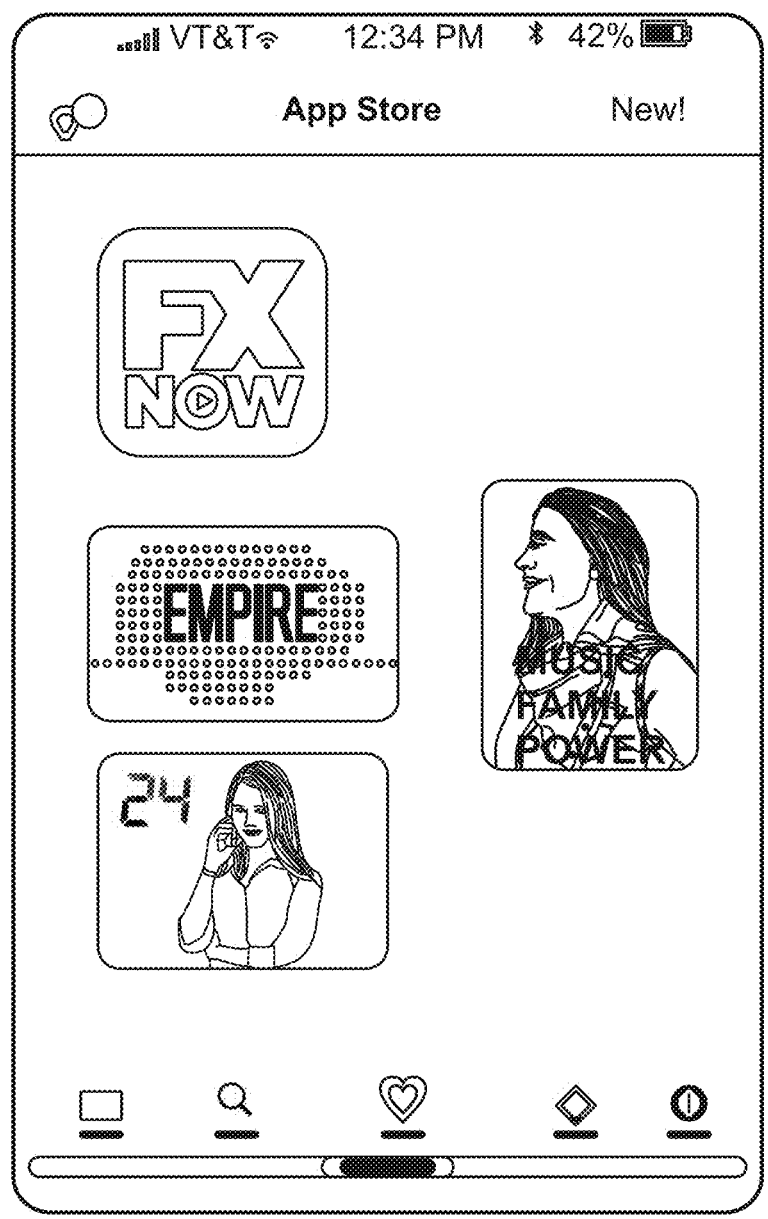
FIG. 10 is a diagram depicting an application store interface.

FIG. 10 is an exemplary diagram of an interface wherein a user-selected CPA 134 (in the illustrated case, the FX CPA 134) are obtained and downloaded to the user device 130 from an application store. In any case, the provision and installation of the selected CPA(s) 134 is illustrated in blocks 522 and 524 of FIG. 5

In the foregoing description, the functional allocation of the operations depicted in blocks 506-520 and 524 between the user device 130 and the SMS 202 are as indicated in FIG. 5. However, other functional allocations are also possible and within the scope of this disclosure. For example, the determination of whether the CPA is installed for selected media programs and/or favorites as depicted in block 514 may be performed by the SMSA 206 installed on the user device 130.

Figure 11:
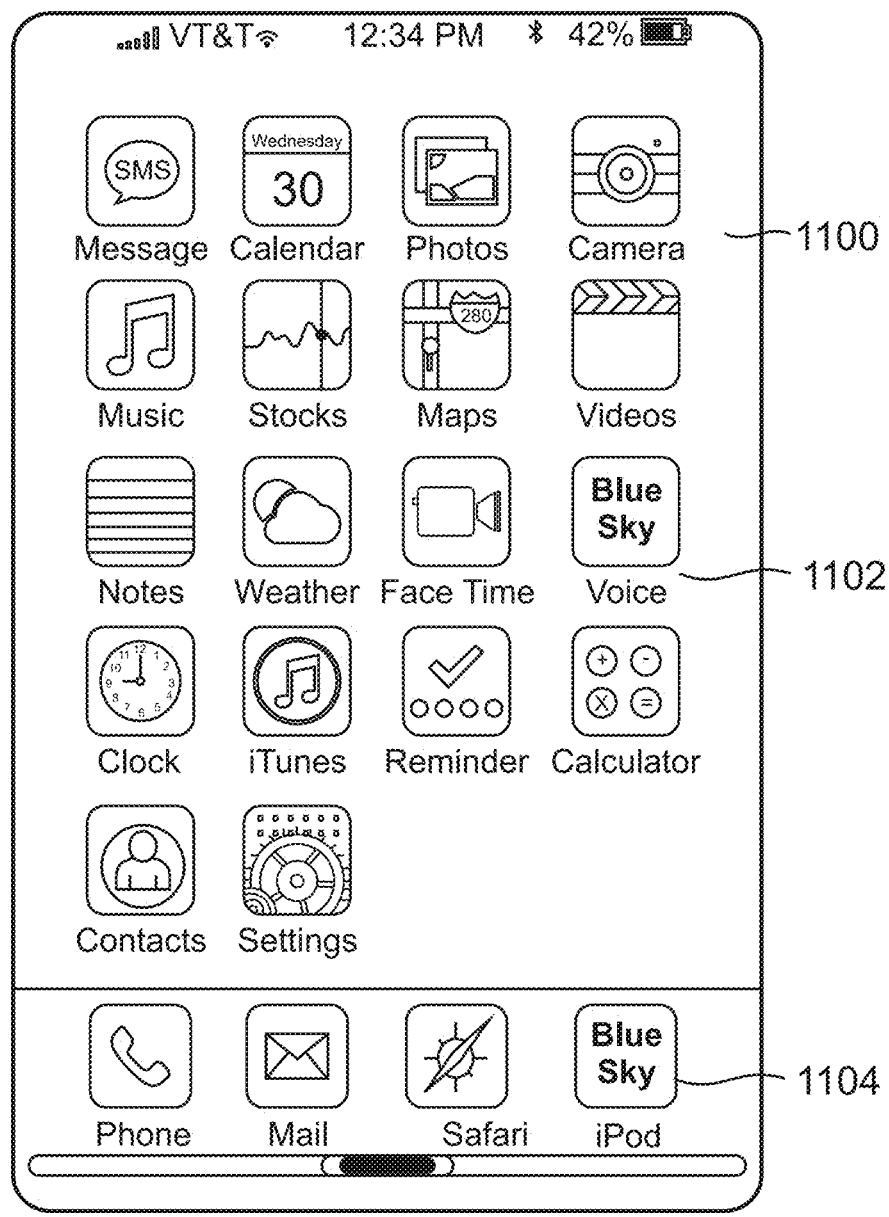
FIG. 11 is a diagram illustrating one embodiment of a home screen of a user device.

FIG. 11 is a diagram illustrating one embodiment of a user device 130 home screen 1100 after installation of the SMSA 206. The installed SMSA 206 may be launched by user selection of a suitable control 1102 in the home screen, or control 1104 on the menu bar. Program guide information updates may be continually obtained from content providers or third parties, and provided to the user devices 130.

Figure 12:
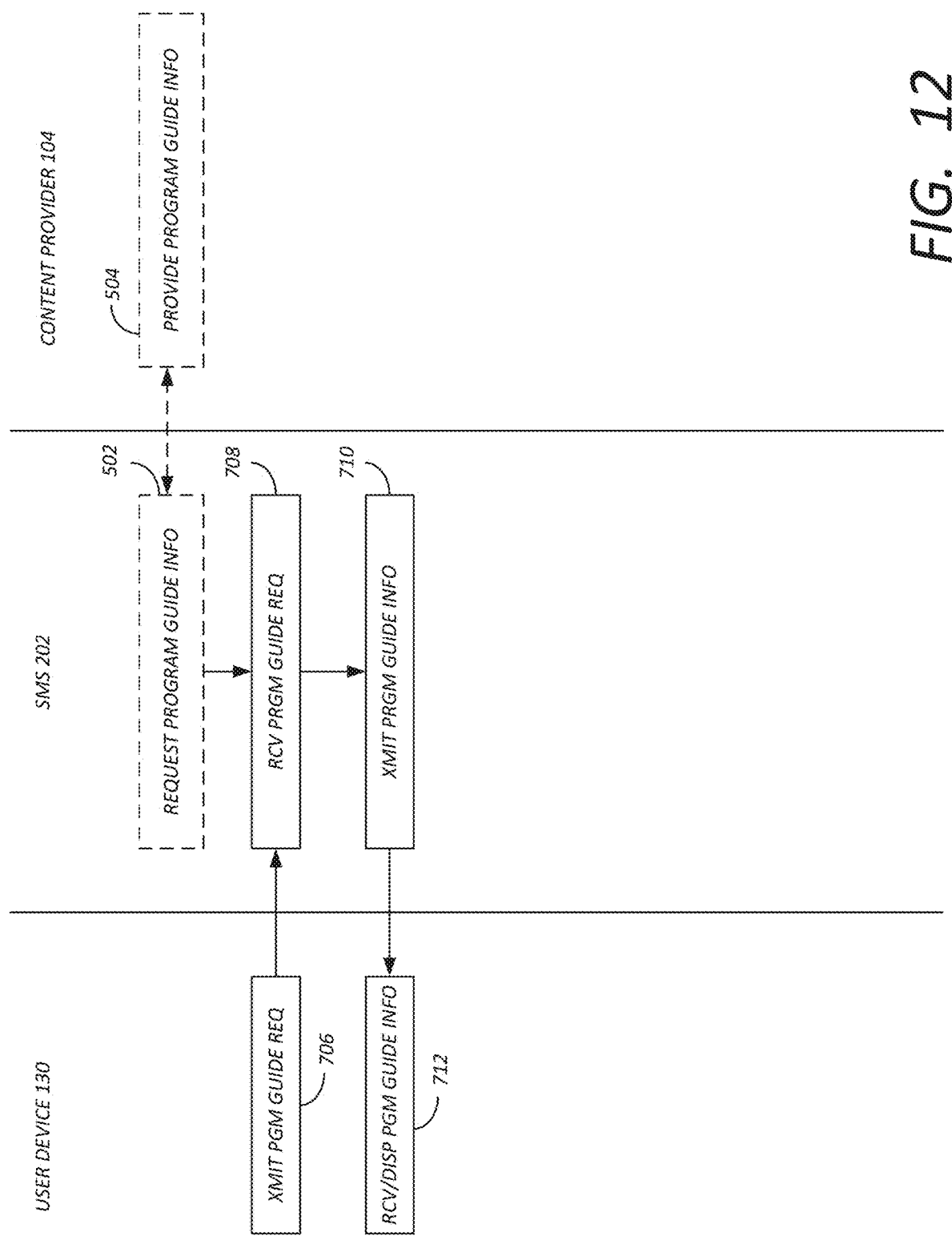
FIG. 12 is a diagram presenting illustrative operations that can be used to provide a program guide of information regarding the media programs available from the plurality of content providers.

FIG. 12 is a diagram presenting illustrative operations that can be used to update a program guide of information regarding the media programs available from the plurality of content providers 106. As described in connection with FIG. 5, the SMS 202 requests and obtains program guide information from the content providers 104 or from a third party service, as shown in blocks 502 and 504. Using the program guide information, the SMS 202 generates a program guide that is provided to the user device 130 via the SMSA 206 upon request. In block 1206, the user device 130 (whether automatically or because of the user 122 selecting a control) transmits a program guide request to the SMS 202 to request program guide information maintained by the SMS 202 about the media programs available from the content providers 104. The SMS 202 receives the request and transmits the program guide information to the user device 130, as shown in bocks 1208 and 1210. The user device 130 receives the program guide information, and displays the program guide information for the user 122 to view, as shown in block 1212. In other embodiments, the program guide information is transmitted directly to the user device 130 by the content provider 104, either by "pushing" the data (e.g. the content provider 104 transmitting the data to the user device 130 without a request from the user device 130 for such data) or upon user device 130 request.

In one embodiment, the program guide itself is assembled by the SMS 202 using the program guide information, and transmitted to the user device 130. For example, the program guide may be presented as a web page that the user device 130 simply retrieves from the SMS 202. In other embodiments, the program guide information is assembled into the program guide by the user device 130 using the SMSA 206, and the SMS 202 merely transmits the information required to assemble the program guide to the user device 130.

The program guide described above allows the user 122 to select content for presentation by the user device 130. For example, returning to FIG. 3, a playback request to view a selected media program may be transmitted from the user device 130, as shown in block 310.

In a first embodiment (illustrated by the solid lines of FIG. 3) this the playback request may received in the user device 130 via the SMSA 206, and provided to the SMS 202, which performs the operations shown in blocks 312 and 314 of FIG. 3 (e.g. receiving the request and irretrievably passing the user device to the selected content provider 104 so that the selected media program may be received and played by the user device 130).

In another embodiment (illustrated by the dashed line in FIG. 3), the playback request is instead received in the user device 130 via the CPA 134 of the content provider 104 of the selected program. If the required CPA 134 is not installed on the user device, the CPA 134 is obtained and installed as described further below with respect to FIGS. 10 and 17. If the required CPA 134 is installed on the user device, control is passed to that CPA 134 and the downloading and replay of the selected media content may commence.

Turning to the first embodiment, the user device 130 transmits a request to playback the media program to the SMS 202, for example, using the SMSA 206. This is illustrated in block 310. As shown in blocks 312 and 314, the SMS 202 receives the request, and irretrievably passes the user device 130 to the content provider application 134 of the content provider 104 providing the selected media program so that the media program can be received and played back by the user device 130 using the CPA 134 of the content provider 104.

"Irretrievably" passing the user device 130 to the content provider 104 refers to the fact that neither the SMS 202 nor the SMSA 206 is capable of initiating an action by itself (e.g. without user input directing it to do so) to pass the processing of the user device 130 back to the SMSA 206 or to interface with the SMS 202. While the user 122 may enter a command to the user device 130 to re-enter the SMSA 206 or contact the SMS 202, the SMSA 206 and the SMS 202 are incapable of doing so themselves, and hence, cannot "retrieve" the user 122 or user device 130. Thus, when the user 122 or user device 130 is passed to the content provider 104, the user experience is then determined by the interface provided by the CPA 134 of the content provider 104. Hence, the content provider 104 controls the user interface provided by the user device 130 to the user, and the user experience. The content provider 104 may present other programs, advertising, or other materials to retain the user 122 watching their media programs, and the content provider 104 will essentially lose control over the user's user interface and viewing experience to the SMS 202 only if the user 122 affirmatively commands the user device 130 to return to the SMSA 206 or otherwise contact the SMS 202.

Such "irretrievable" passing can be implemented in either of the two embodiments described above. In the first embodiment wherein the SMSA 206 transmits a playback request to the SMS 202, the SMS 202 may simply irretrievably pass the user device 130 to the content provider 104 of the selected media program. In the second embodiment wherein the playback request is transmitted to the CPA 134 associated with the content provider, the SMSA 206 may irretrievably pass processing to the CPA 134, which then makes the playback request to the content provider 104. This embodiment is illustrated by the dashed lines of FIG. 3.

For example, in the embodiment illustrated in FIG. 6, the user 122 has selected an episode or media program from the new episode row 604 by selecting thumbnail 610. In the first embodiment, this transmits the playback request to the SMS 202, which irretrievably passes the user device 130 to the content provider 104 of the selected media program. The SMS 202 and the content provider 104 then work together to enable playback of the media program from the content provider using the CPA 134 associated with the media program executing on the user device 130. For example, the SMS 202 or SMSA 206 may direct the user device 130 to execute the CPA 134 associated with the content provider 104 providing that media program. The SMS 202/SMSA 206 may then provide the CPA 134 with information that identifies the selected media program (e.g. a program or episode identifier), user credentials, if required, and irretrievably passes processing to the CPA 134, so that the CPA 134, when executed, obtains the media program directly from the associated content provider 104 and provides that media program to the CPA 134 for viewing on the user device 130, as shown in blocks 320 and 322.

Alternatively, the SMSA 206 or SMS 202 may simply pass control over the request to the CPA 134 associated with the content provider of the media program, for example, by providing the user credentials and the identity of the requested content to the CPA 134.

In one embodiment, the SMSA 206 and CPA 134 perform an automatic authentication by passing or exchanging credentials, thus freeing the user 122 from the need to enter logon or other credentials when accessing the media program from the content provider 104. For example, referring back to FIG. 4, the user 122 registered with a user ID (which may be an email address) and a password. Those credentials may be stored by the SMSA 206 or the SMS 202, and used by the SMSA 206 or the SMS 202 to validate a subscription for the registered user 122 to media programs from the content provider 104 (i.e., the SMS 202 registers the user 122 as a subscriber to the content provider's media programs). Those same credentials may be stored (either by the SMSA 206 or the SMS 202) and provided to the content provider 104 automatically when the media program is selected for playback.

Figure 13:
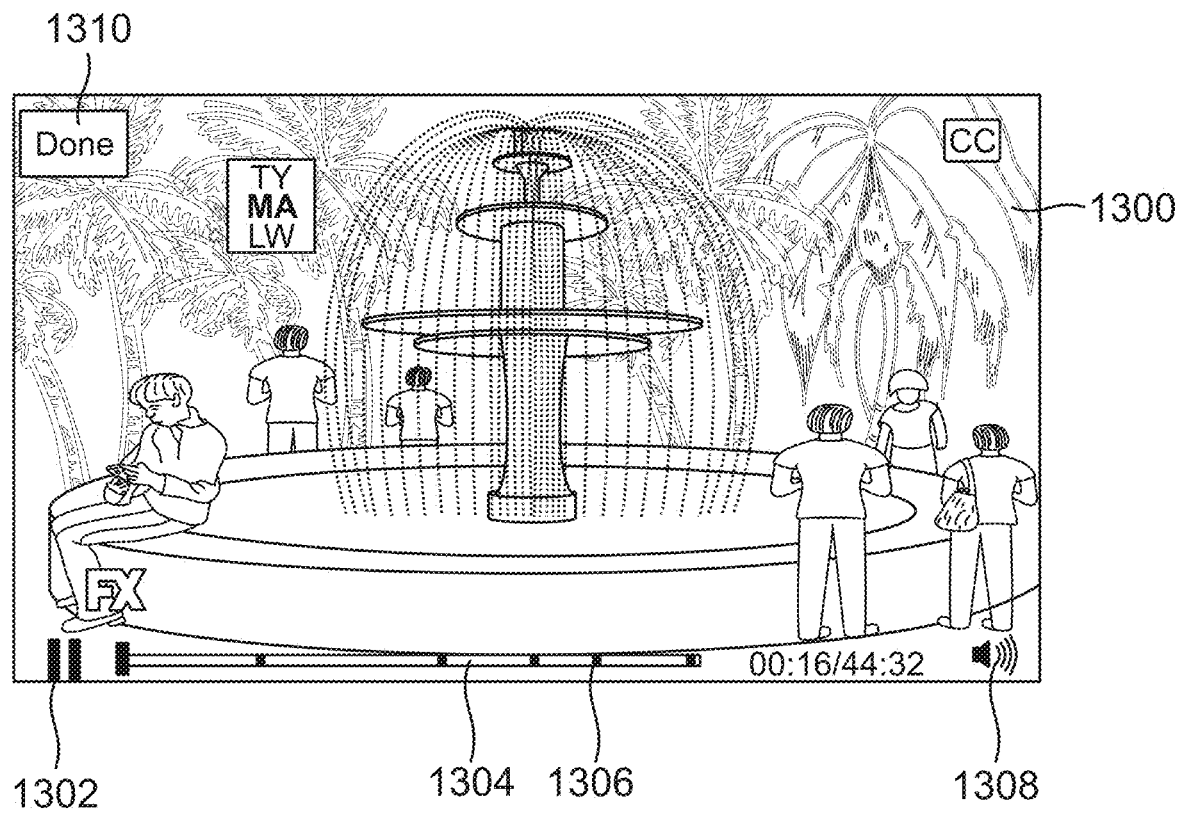
FIG. 13 is a diagram showing an exemplary embodiment of the content provider application presenting the user-selected media program on a display of the user device.

FIG. 13 is a diagram showing an exemplary embodiment of the CPA 134 presenting the user-selected media program on a display of the user device 130, as shown in blocks 320 and 322. In this embodiment, the CPA 134 includes a media program player that is used to for playback purposes. As illustrated, the user 122 has selected a thumbnail associated with a media program (e.g. an episode of the SONS OF ANCARCHY), thus launching the FX (the content provider 104 of SONS OF ANARCHY) CPA 134 and automatically playing the media program using the FX CPA 134. The media program player generates and provides a media program player interface 1300 that includes a pause control 1302, a progress bar 1304 that includes annunciators 1306 that indicate commercial breaks, and a volume control 1308. Also generated and presented is an exit control 1310, which, when selected, terminates the playback of the media program, and closes the media program player.

In one embodiment, the media program player used to present the media program on the user device 130 is included within the CPA 134 provided and maintained by the content provider. In another embodiment, the media program player used to present the media program on the user device 130 is included within the SMSA 206. Alternatively, the media program player may be provided with the user device 130 itself, for example, a QUICKTIME application provided by APPLE, INC. for use on an IPHONE.

In one embodiment, when the user 122 selects the exit control 1310, or when the playback of the selected media program has been completed, the user 122 is returned to the program guide interface 600 shown in FIG. 6, allowing the user 122 to select another media program, possibly from a different content provider 104.

However, in a preferred embodiment, upon user selection of the exit control 1410 or completion of the playback of the selected media program, the user 122 is instead directed to another interface provided by the content provider 104 of the selected media program. In embodiments wherein the media program player is included within the CPA 134, the content provider 104 retains control over the user device 130, and hence, can simply program the CPA 134 to direct the user device 130 to the processing or interface desired by the CPA. In embodiments wherein the media program player is included within the SMSA 206, the SMSA 206 can sense the user selection of the exit control 1410 or completion of playback, and direct the user device 130 processing as specified by the content provider 104.

Figure 14:
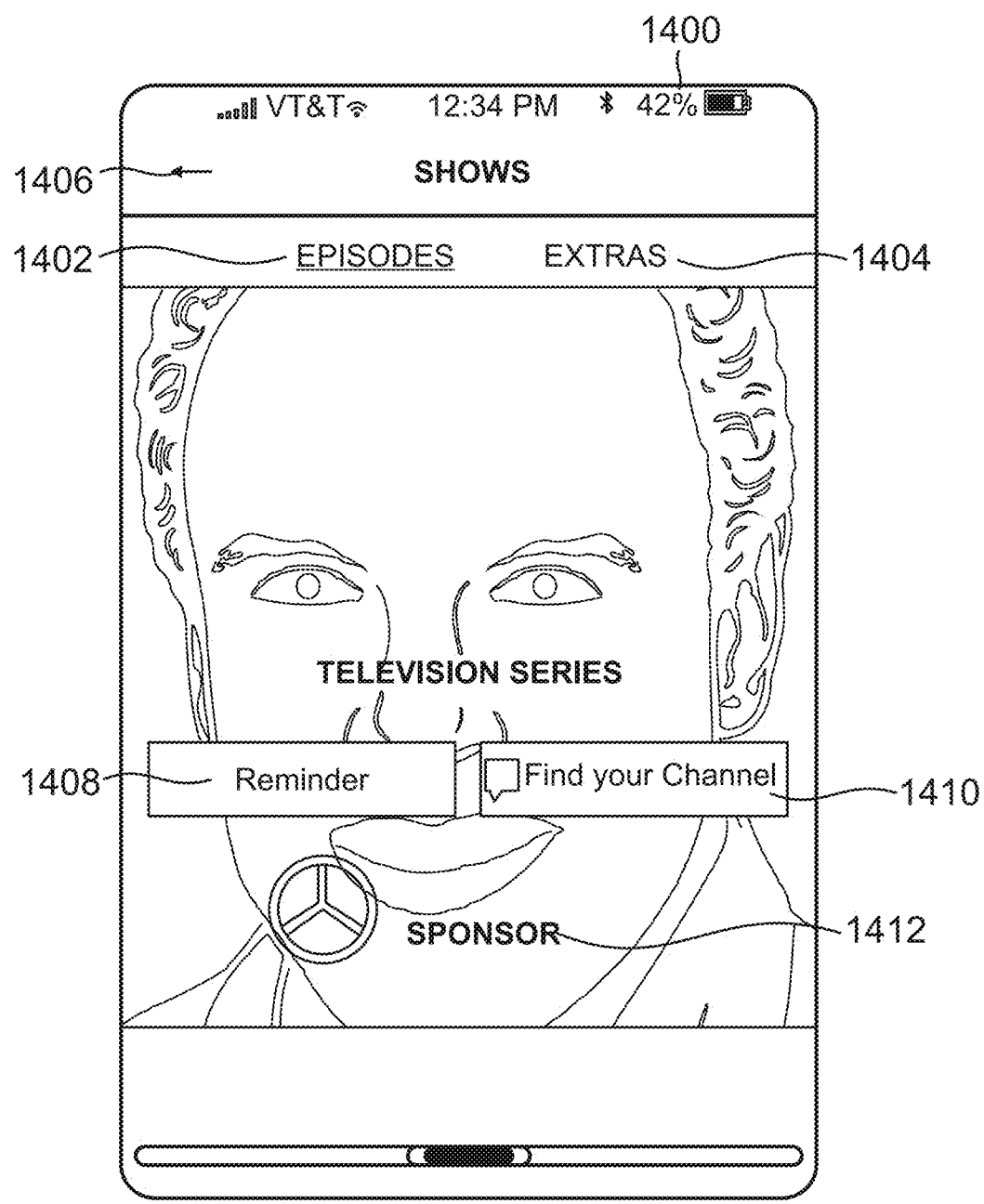
FIG. 14 is a diagram illustrating a content provider application-implemented interface presented by the user device upon termination of playback of the media program.

FIG. 14 is a diagram illustrating a CPA 134 implemented interface 1400 presented by the user device 130 upon termination of playback of the media program, whether by user 122 intervention or completion of such program. Control 1402 allows the user 122 to see which episodes of the series are available via the CPA 134. Control 1404 provides access to extra information regarding the selected media program such as actor bios and the like. Navigation arrow 1406 allows the user 122 to enter the CPA 134 main menu so that other media programs and episodes from only the same content provider 104 may be viewed using the CPA 134. Control 1408 allows the user 122 to set push notifications when episodes of the selected media program appear on a live broadcast or when new episodes are available from the content provider 104 to be viewed via the CPA 134. Control 1410 allows the user 122 to find the broadcast schedule and channel for the media program episode or series from service providers 102 such as DIRECTV or DISH (which are identified in other user interfaces). The interface 1400 may also include advertising 1412, allowing the content provider 104 to generate further revenue from the presentation of the media program to the user 122.

The foregoing permits the content provider 104 that provided the selected content to retain the interest and attention of the user 122 when playback of the media program terminates. Hence, the content provider 104 now controls the user interface presented on the user device 130, allowing the content provider 104 to determine what is offered to the user 122. This allows the content provider 104 to redirect the user 122 to other media programs from the content provider 104, to sponsored advertising, or other information. Although the user 122 is not prevented from returning to the SMSA 206 to find and view media programs from other content providers if they so choose (e.g. by simply returning to the home page of the user device 130, such as shown in FIG. 11, and selecting control 1102 or 1104), the SMSA 206 or SMS 202 cannot initiate any action of its own accord to return the user device 130 to the SMSA 206. Hence, the SMSA 206 and the SMS 202 has lost control over the viewing experience/interface provided to the user 122, and by doing so the user device 130 has been irretrievably passed to the content provider 104. This contrasts to systems wherein playback of the media program is accomplished via the SMSA 206, and the SMSA 206, by virtue of retaining control over the user device 130, can redirect the user 122 back to the SMSA-provided program guide 600 after termination of playback. This also contrasts with other CDS 100 systems such as HULU, in which the user 122 is encouraged to watch shows from other content providers 104 after completion of the playback of the selected media program. However, the user 122 may take an affirmative action by entering a command to the user device 130 to leave the CPA 134 and instead rejoin or restart the SMSA 206, for example, using general navigation commands of the user device 130.

Figure 15:
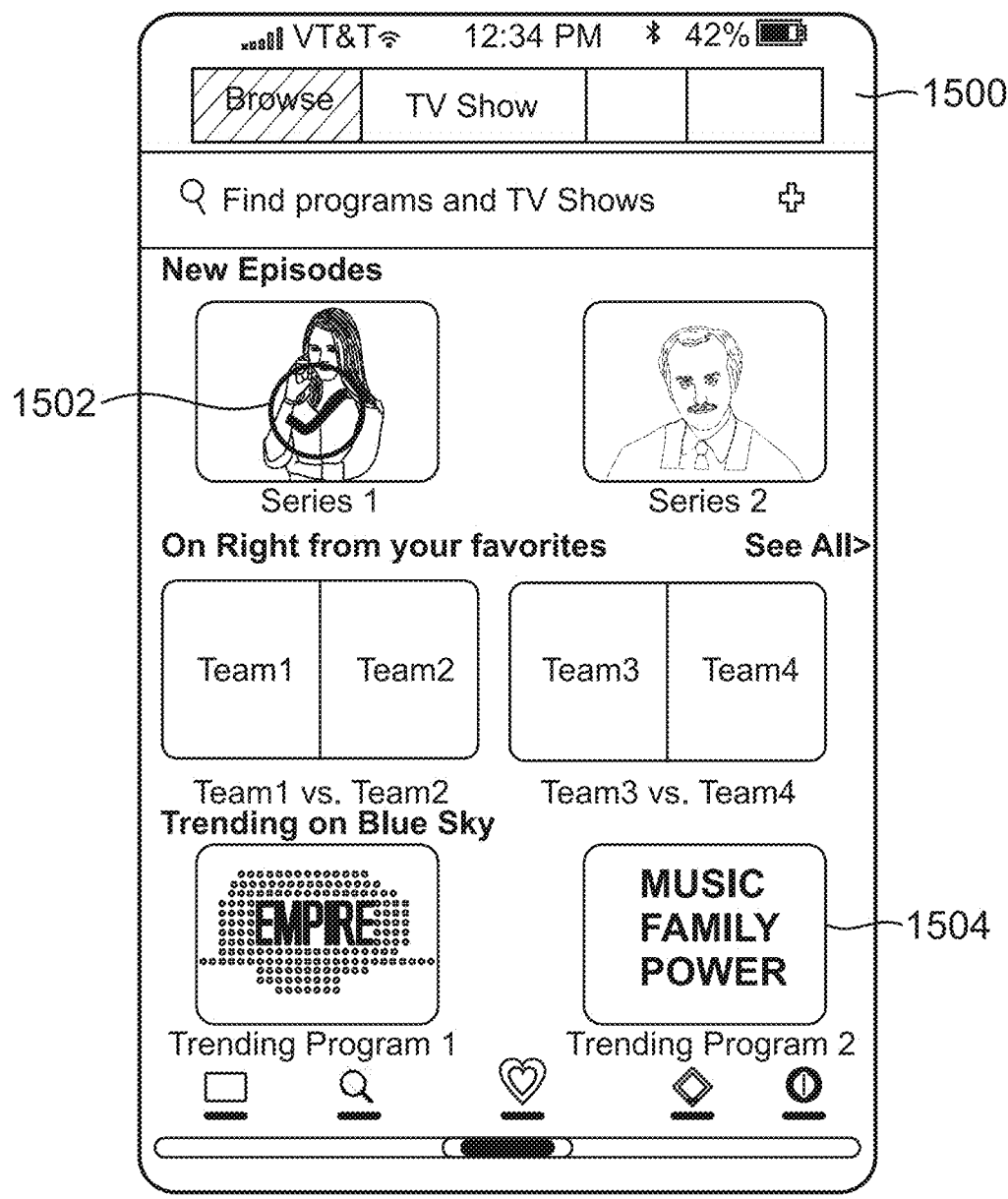
FIG. 15 is a diagram illustrating the program guide interface presented by the user device after the user has viewed a selected media program and rejoined or restarted the subscription management service application.

FIG. 15 is a diagram illustrating the home page 1500 or program guide interface presented by the user device after the user 122 has viewed a selected media program and rejoined or restarted the SMSA 206. Note that the thumbnail associated with the media program that was earlier selected and has been at least partially viewed is annotated with an annotation 1502 (in the illustrated embodiment, using a check mark) to indicate that this program has been viewed. In alternative embodiments, the thumbnail itself may be removed the first time the use returns to the program guide interface 1300 after viewing at least a portion of the selected media program, or after the expiration of a time period after viewing the media program.

Figure 16:
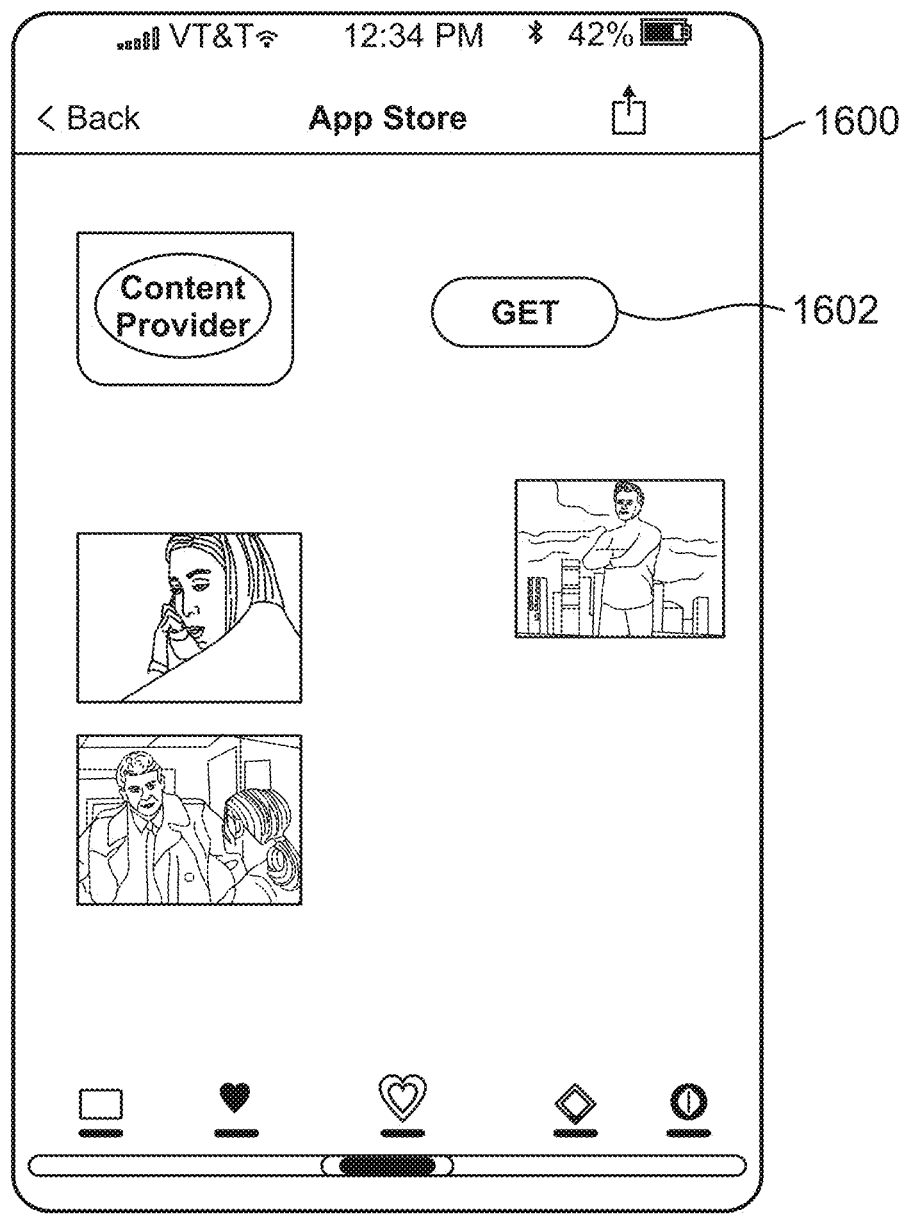
FIG. 16 is a diagram illustrating an exemplary application source interface.

The program guide interface 1300 also presents other thumbnails, providing links to view other media programs, potentially from other content providers 104. For example, selection of thumbnail 1504 commands the SMSA 206 to transfer control to the content provider 104 of the associated media program. In the illustrated embodiment, the media program is an Episode A of Series 1, and is available from the content provider A 104. The user device 130 determines whether the CPA 134 provided by content provider A 104 of the requested media program is already installed on the user device 130. If the required CPA 134 is already installed, the user device 130 is irretrievably referred to the CPA 134 and the content provider 104 as before. But if the required CPA 134 is not already installed on the user device 130, the user device 130 is referred either to the content provider 104 or third party application source to obtain the required CPA 134, as described further below with respect to FIG. 16. FIG. 16 is a diagram illustrating an exemplary application source interface 1600. Using this interface, the user 122 can select control 1602 to download the required CPA 134 provided by and maintained by content provider 104. Provision of the required CPA 134 may be accomplished directly by the content provider 104 or via a third party. Once downloaded and installed on the user device 130, the CPA 134 may automatically launch to present the selected media program.

Figure 17:
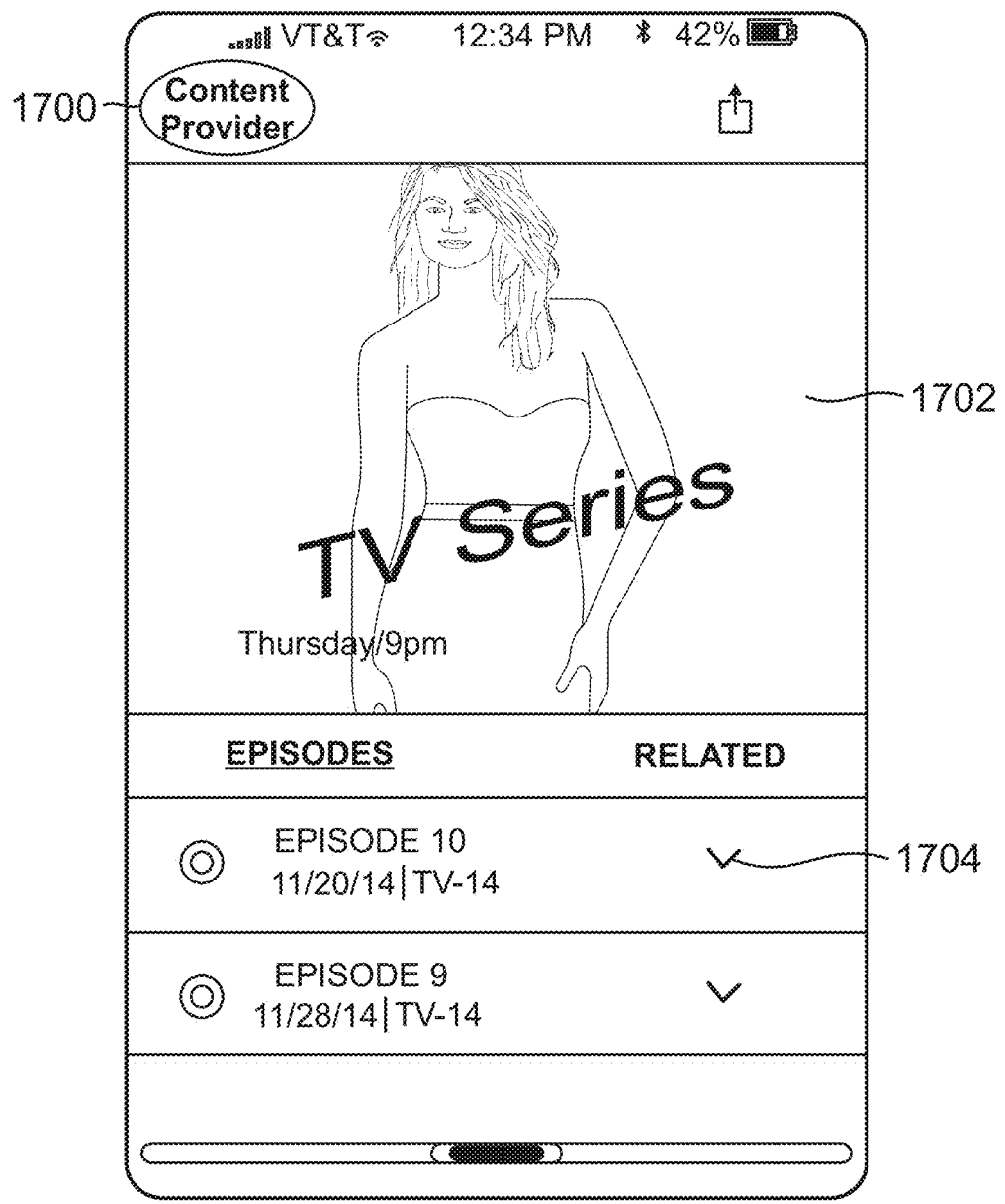
FIG. 17 is a diagram illustrating an exemplary second content provider interface.

FIG. 17 is a diagram illustrating another example of an interface 1700 implemented by a CPA 134. This interface 1700 differs from the interface 1400 illustrated in FIG. 14, because it is presented by a different CPA 134 obtained from a different content provider 104, and the appearance and content of the CPA 134 interface will vary from other CPAs 134. In the CPA 134 interface shown in FIG. 17, a screen portion 1702 showing the selected media program is presented along with an episode selection portion 1704.

Returning again to FIG. 3, the SMS 202 and the content provider 104 then cooperatively enable the playback of media program content from the content provider 104 using the CPA 134 for the selected content, as shown in blocks 316 and 318. Such enablement may include determining whether the user 122 is authorized to receive and play the media content with the user device 130. For example, once the user 122 has selected an episode to play back, the content provider may query the user 122 to determine whether the user 122 is authorized to receive the selected media program. In the previous example of the user 122 selecting the SONS OF ANARCHY episode media program, the user 122 was previously determined to be authorized to receive the media program or no authorization was required, so the content provider 104 did not request the user's credentials before providing the media program for viewing.

In this example, it is presupposed that the user 122 has not been authorized to view the media program, and such authorization is required before the media program is provided. If the user 122 has not been preauthorized to view the media program, such authorization may commence as described below to enable the playback of the media program from the content provider 104.

Figure 18:
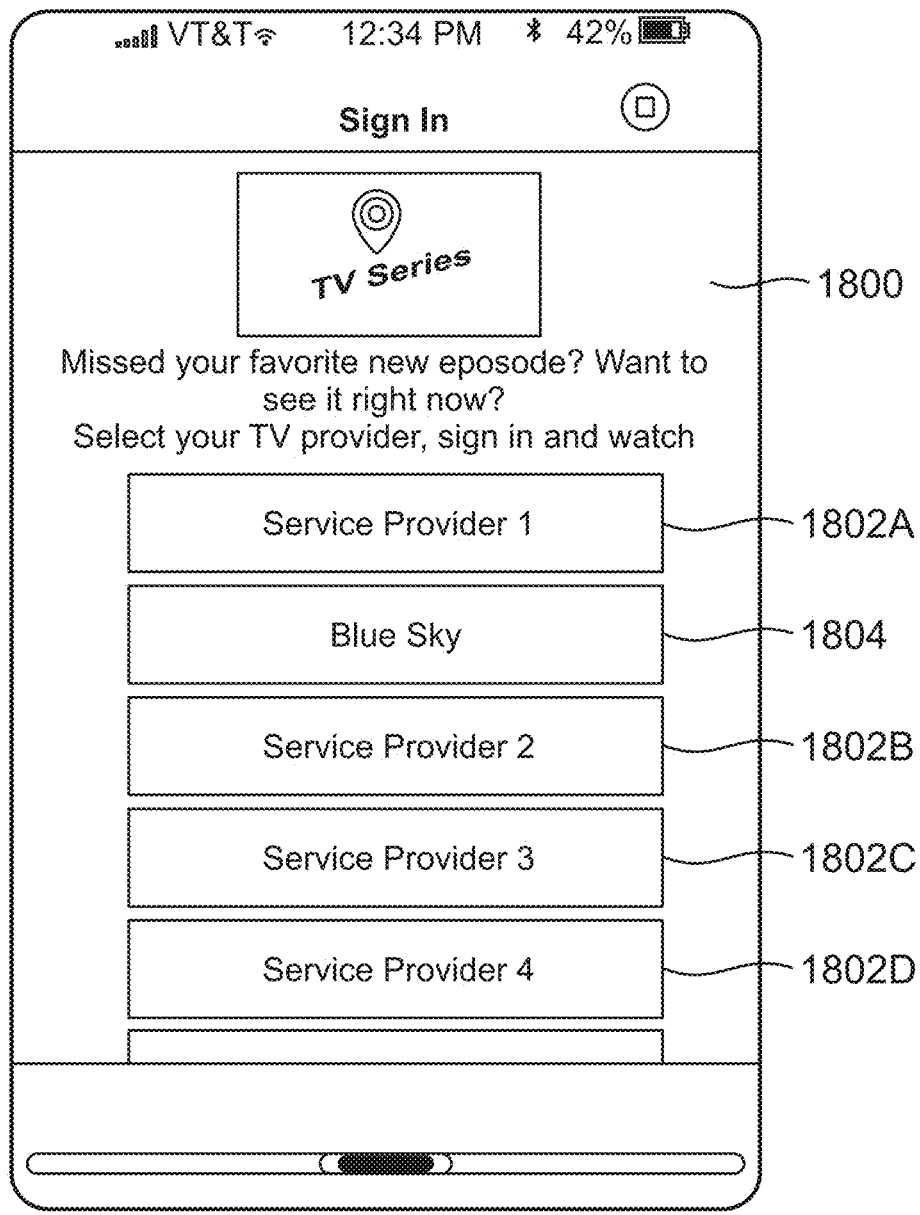
FIG. 18 is a diagram illustrating an exemplary embodiment of a content provider credential user interface.

FIG. 18 is a diagram illustrating an exemplary embodiment of a content provider 104 credential user interface 1800 presented by the CPA 134 or by the content provider's website. The interface 1800 includes a control 1802A-1802D for each of one or more service providers 102 that include the media program or episode series in the service packages they provide to customers. The interface 1800 also includes a control 1804 that is associated with the SMS 202, allowing the user's SMS 202 credentials to be used to access the desired media program. Accordingly, the SMS 202 is accorded the same status with the content provider 104 as a traditional television service provider 102. Further, the SMS 202 responds to such credential requests in the same way as a television service provider 102, thus the content provider 104 can use the same interface and interface protocols to authenticate the user 122 with the SMS 202 that it uses for customers of the television service providers 102, and need not generate or maintain a separate interface.

If the user 122 selects the control 1804 associated with the SMS 202, the user device 130 presents the interface shown in FIG. 4. In this case, the user 122 may enter the user ID and password used to register with the SMS 202 in input forms 404 and 406 respectively. This information is used to determine if the user 122 is authorized to receive and play the media program using the user device 130 via the CPA 134.

The verification of the user 122 credentials to view the media program from the content provider 104 can be performed in a number of different ways.

In one embodiment, when the user selects the SMS 202 by selecting control 1804, the content provider 104 or related CPA 134 refers the user 122 to an interface maintained by the SMS 202 (or SMSA 206) along with an identifier of the content provider 104 and the media program requested. After the user 122 enters the appropriate information, the SMS 202 (or SMSA 206) uses the user-entered information and identifying information from the content provider 104 (or CPA 134) to verify that the user 122 is subscribed to the identified media program (and/or content provider 104). If the user 122 is so authorized, the SMS 202 (or SMSA 206) transmits a message to the content provider 104 (or CPA 134), indicating that the user 122 is authorized to receive the media program. This embodiment is particularly applicable to embodiments wherein the media program request illustrated in block 310 of FIG. 3 is transmitted directly to the content provider 104 via the CPA 134.

In another embodiment, user 122 need not enter such credentials when prompted by the content provider 104 (or CPA 134). Such is the case wherein the user's request for the media program is transmitted via the SMSA 206 or the SMS 202, as also illustrated in FIG. 3. In this case, the SMSA 206 or SMS 202 receives the user's media program request, determines the content provider 104 of that requested media program, verifies that the user 122 is authorized to receive and play that media program, and irretrievably passes the request to the appropriate content provider 104 or CPA 134. When the content provider 104 or CPA 134 receives this request, the content provider 104 or CPA 134 may transmit a message to the SMS 202 or SMSA 206 to request the user's credentials, and such credentials can be provided by the SMS 202 or SMSA 206 to the content provider 104 or CPA 134, thus relieving the user 122 from entering their credentials as described in the earlier embodiment. In still another variant of this embodiment, the SMS 202 or SMSA 206 includes the user credentials in the process of irretrievably passing the user device to the content provider 104 or CPA 134 of the selected media program, thus obviating the need for the content provider 104 or CPA 134 to separately verify that the user 122 is authorized to receive and play the media program using the user device 130.

Notably, the foregoing paradigm permit the use of single user credential (e.g. user ID and password) to obtain media programs from a plurality of content providers 104. It also permits the use of a plurality of different user credentials for each content provider, while still maintaining a single user credential used to register the user 122 with the SMS 202. In this case, the SMS can map the user's SMS registration credentials to the credentials needed to obtain a selected media program from a particular content provider 104.

Once the user 122 has been verified to be authorized to receive and play the selected media program, they may be passed to an episode page of the selected media program or series.

Figure 19:
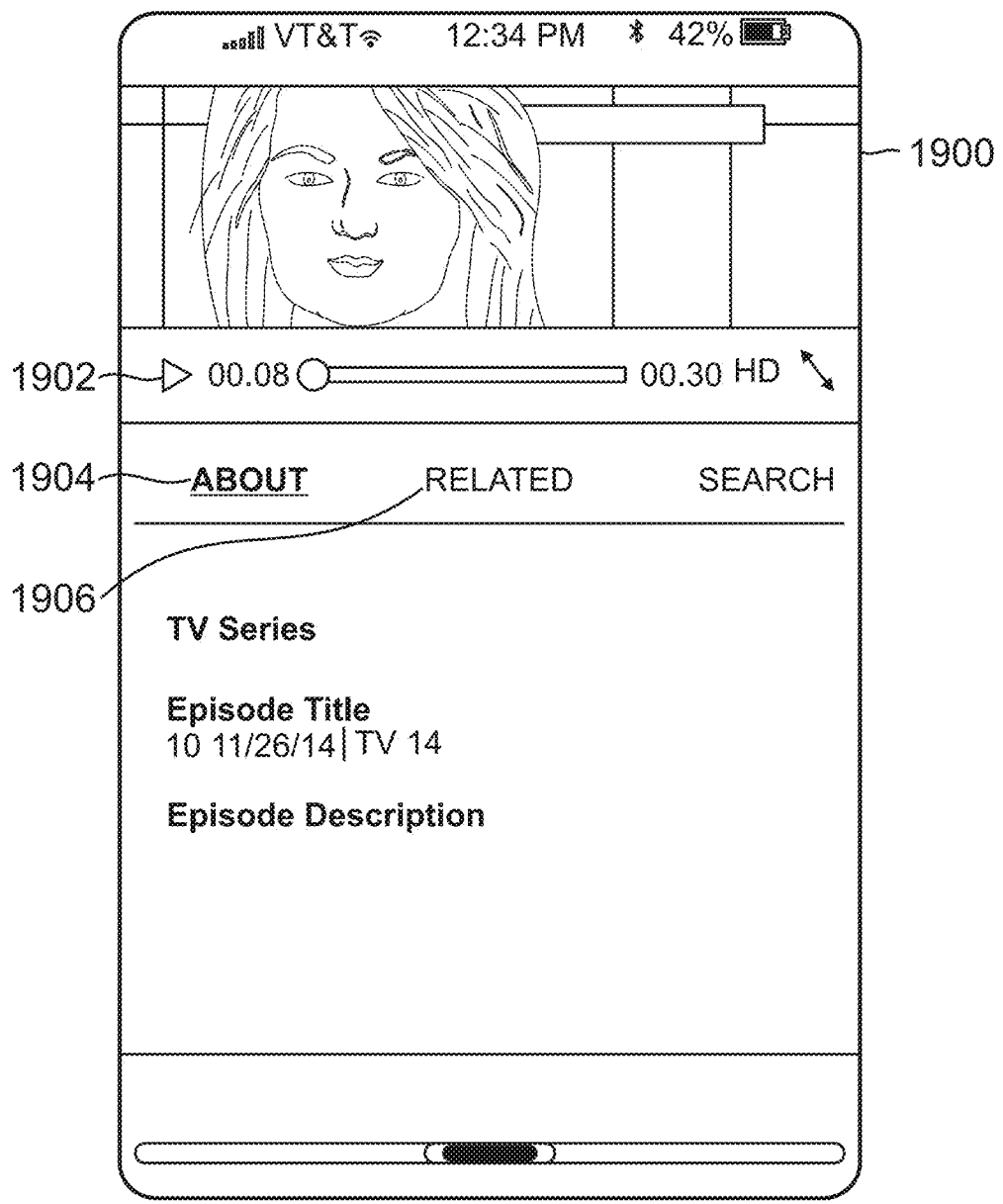
FIG. 19 is a diagram illustrating an exemplary embodiment of an episode page interface.

FIG. 19 is a diagram illustrating an exemplary embodiment of an episode page interface 1900 for a series of media program episodes provided by a content provider 104, as presented by the content provider's CPA 134. The user 122 can manipulate the controls (e.g. play control 1902) so presented to playback the media program. This is illustrated in FIG. 3 in blocks 320 and 322. The user 122 may also select control 1904 to find more information about the media program from the content provider 104, or control 1906 to search for related media programs available from the same content provider 104.

Authentication/Registration for Viewing on Alternative Devices

Figure 20:
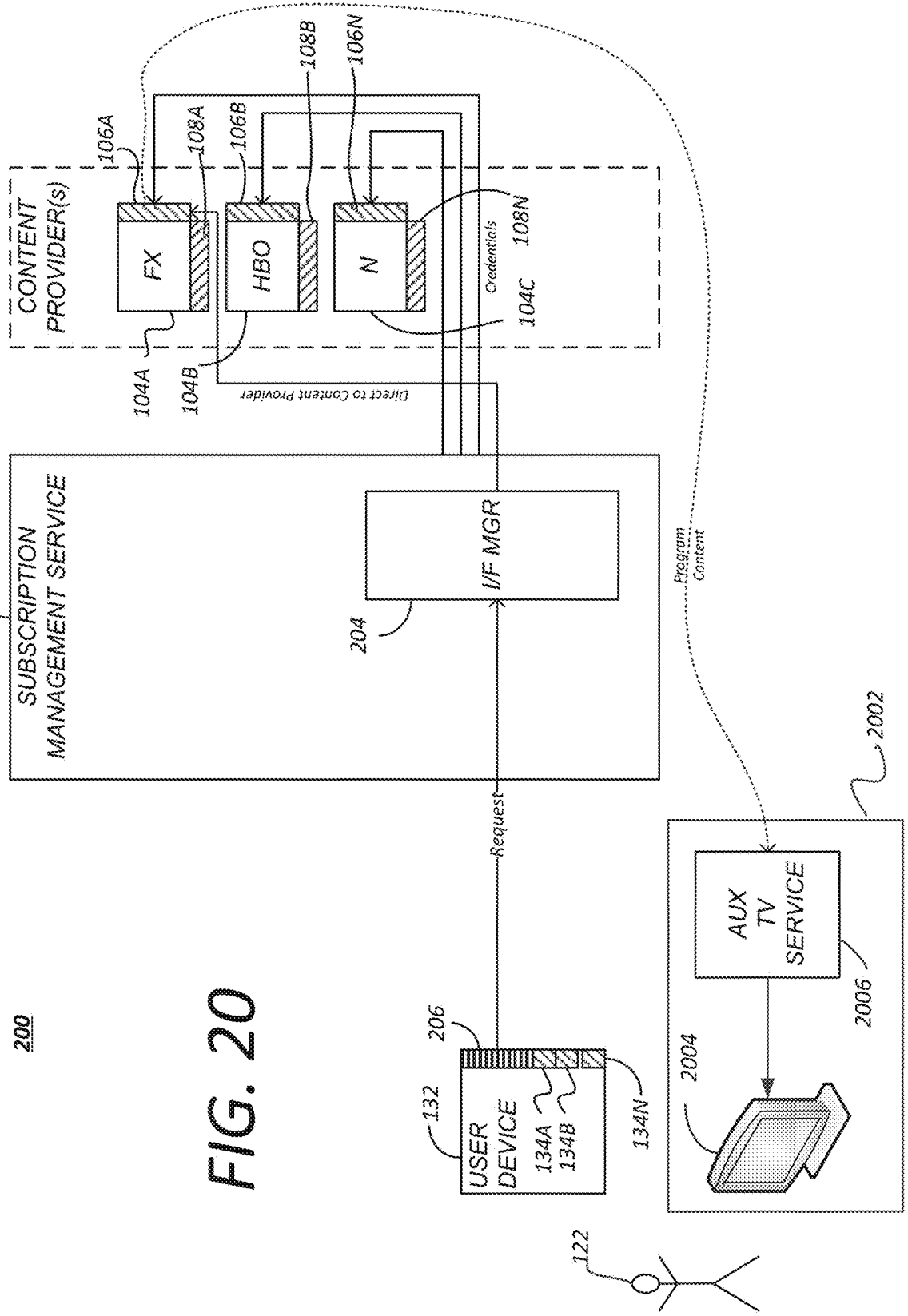
FIG. 20 is a diagram of an alternate embodiment of the content distribution system.

FIG. 20 is a diagram of an alternate embodiment of the CDS 200. In this embodiment, the request for the media program is made using a first user device 130 such as a smartphone, but the media program itself is viewed on an auxiliary viewer device 2002 which may comprise a second display 2004 communicatively coupled to an auxiliary TV service device (ATSD) 2006 such as an APPLE TV or ROKU_device. That the user 122 wishes to view the media program on the ATSD 2002 can be specified in the interface 600 presented in FIG. 6. For example, the user 122 may select control 602 to indicate that they wanted to view the media program on an APPLETV ATSD 2006.

Figure 21:
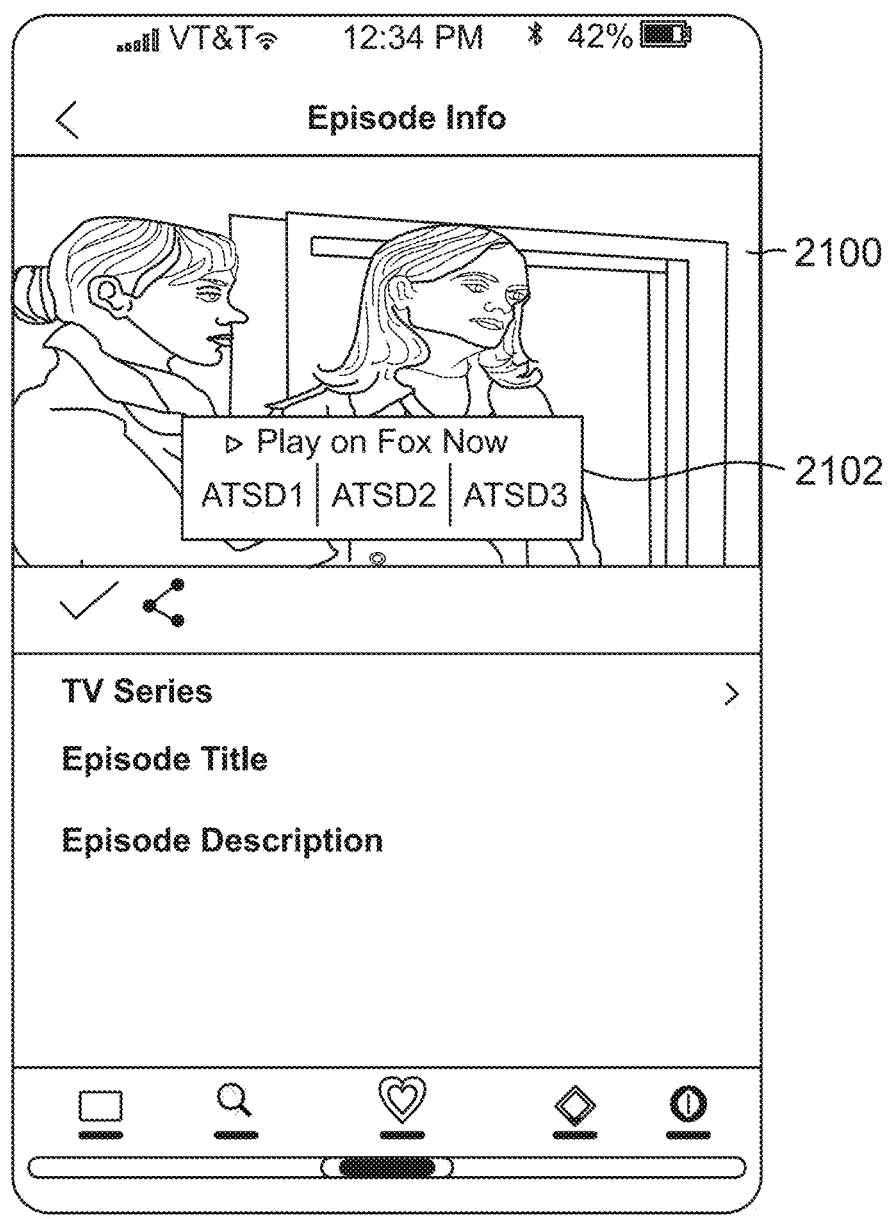
FIG. 21 is a diagram illustrating an embodiment of an interface for choosing an auxiliary content service device for presenting the media program.

FIG. 21 is a diagram illustrating an embodiment of an interface 2100 for choosing an ATSD 2006 for presenting the media program. This may be presented, for example, after the user 122 navigates to the program guide shown in FIG. 6 and selects another media program to be viewed. Using this interface 2100, the user 122 is presented with controls 2102 asking whether they wish to view the media program on the cellphone, or a selected one of the ATSDs 2006. If the user 122 selects the APPLE TV ACSD 2006, for example, the SMSA 206 provides an interface on the user device 130 to assist in validating that the user 122 is permitted to view the selected media program on the ATSD 2006.

In addition to being authenticated by the content provider 104 to assure that the user 122 is authorized to receive the media program, the ATSD 2006 must also be activated to that it operates properly with the ATSD. Ordinarily, such devices are authenticated by requesting that the user 122 navigate the ACSD 2006 to a particular URL and type in an alphanumeric activation code. Although not particularly onerous for a user 122 of a smartphone to enter such a code, it is typically a tedious process to enter the URL and to enter the alphanumeric code on ATSDs, as they typically do not include a convenient keyboard apparatus to enter information. To ameliorate this problem, the ATSD 2006 may be activated instead using a visual code readable by suitably equipped user devices 130.

Figure 22:
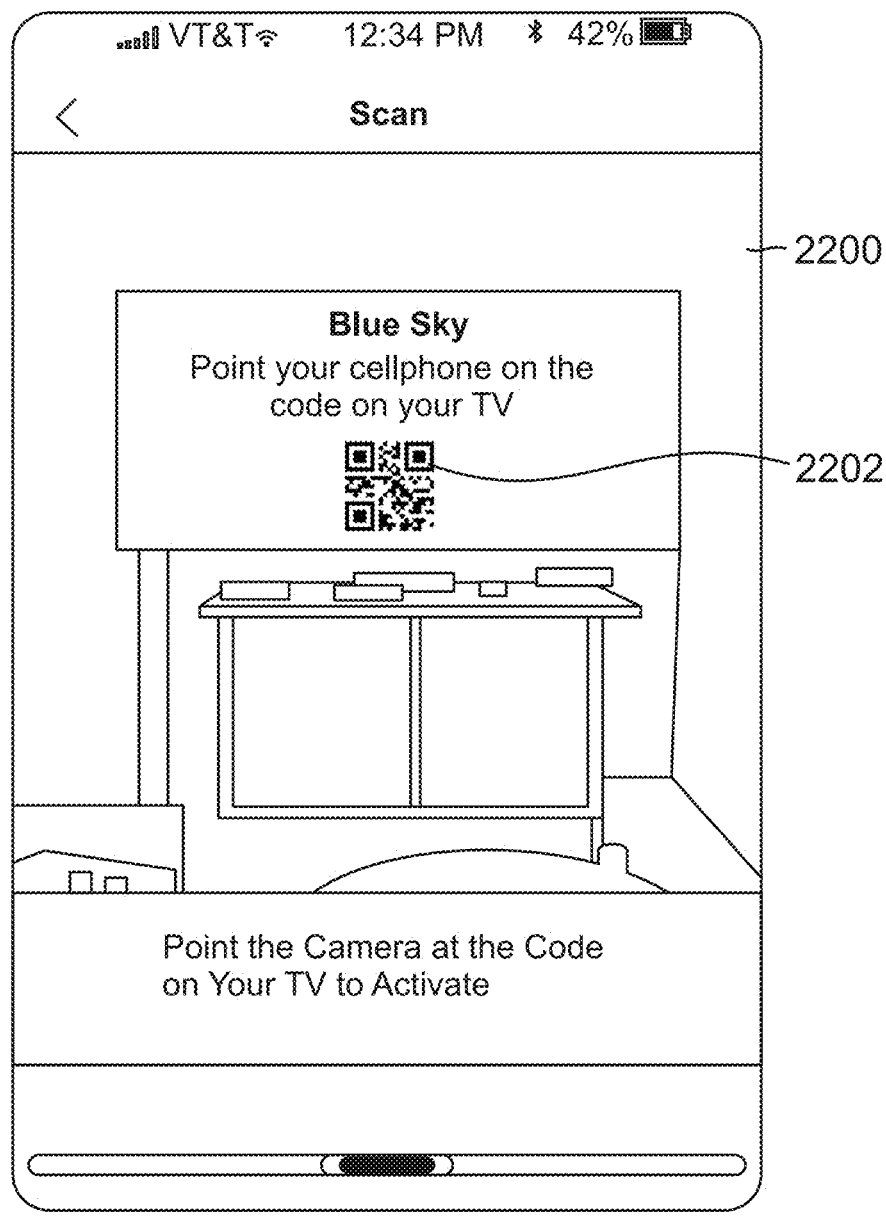
FIG. 22 is a diagram presenting one embodiment of an interface used to validate the auxiliary content service device.

FIG. 22 is a diagram presenting one embodiment of an interface 2200 used to validate the ATSD 2006. In the illustrated embodiment, a video signal is transmitted to the ACSD 2006 that, when presented for display, illustrates a code 2202 for visual presentation. In the illustrated embodiment, the code is a QR code, but other codes may be utilized. The user 122 is directed by the interface 2200 to point a camera of the user device 130 (if so equipped) at the displayed code 2202. The user device 130 scans the presented code, and sends the authentication information to the ATSD or other entity requesting authentication. This allows the ATSD 2006 to be easily activated without the tedious process of entering a URL using the typically difficult to use ATSD user 122 interfaces. Once activated, the user 122 is prompted to choose a service provider such as is shown and described with respect to FIG. 19 and FIG. 4.

Hardware Environment

Figure 23:
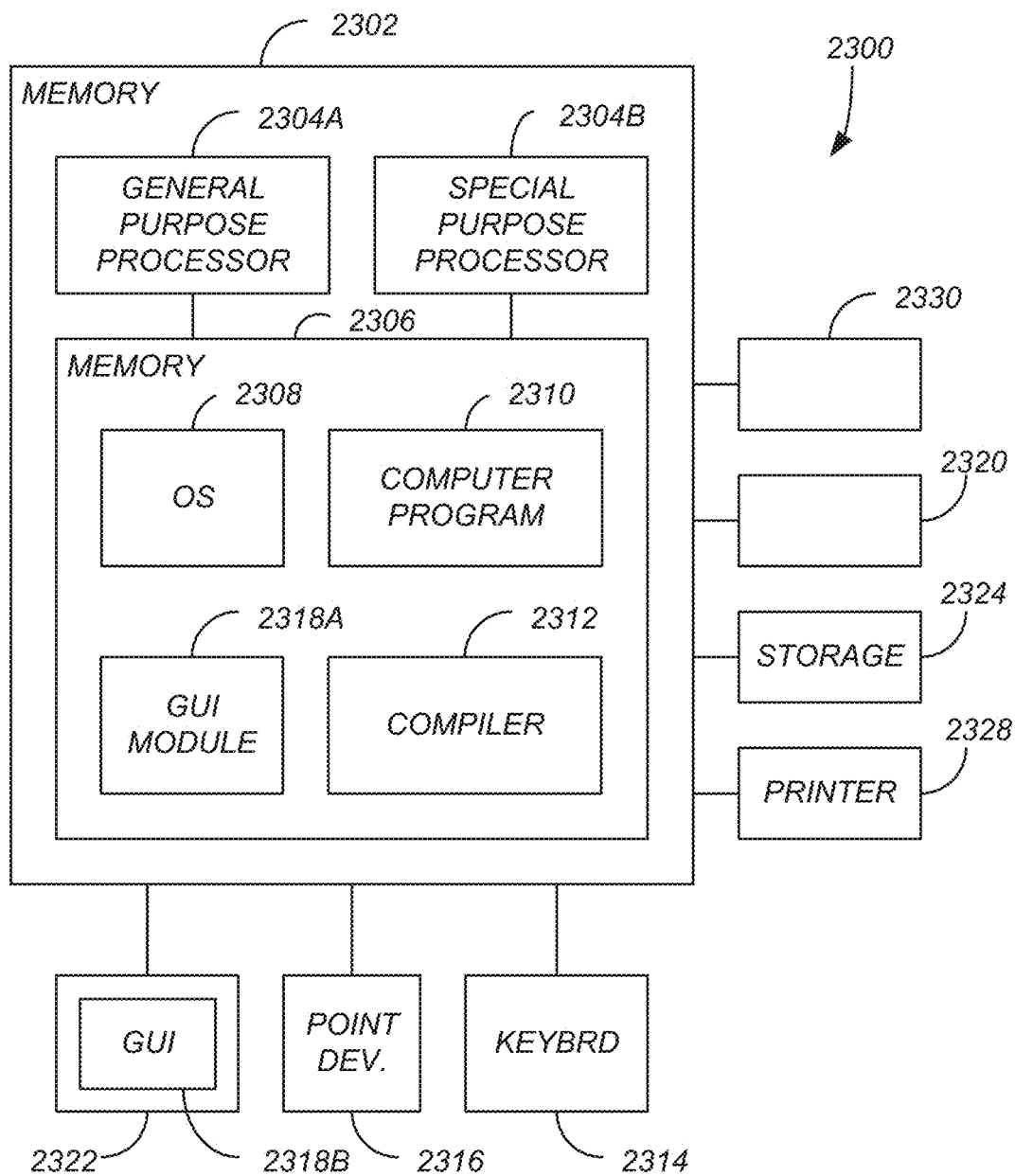
FIG. 23 is a diagram illustrating an exemplary general purpose system that may be used to implement elements of the present invention.

FIG. 23 is a diagram illustrating an exemplary general purpose system 2300 that could be used to implement elements of the present invention, including elements of the subscription management service 202, the user device 130, and the ATSD 2106. The system 2300 comprises a processing device (alternatively referred to hereinafter as a computer) 2302 comprises a general purpose hardware processor 2304A and/or a special purpose hardware processor 2304B (hereinafter alternatively referred to collectively as processor 2304) and a memory 2306, such as random access memory (RAM). The computer 2302 may be coupled to other devices, including input/output (I/O) devices such as a keyboard 2314, a mouse device 2316 and a printer 2328.

In one embodiment, the computer 2302 operates by the general purpose processor 2304A performing instructions defined by the computer program 2310 under control of an operating system 2308. The computer program 2310 and/or the operating system 2308 may be stored in the memory 2306 and may interface with the user 122 and/or other devices to accept input and commands and, based on such input and commands and the instructions defined by the computer program 2310 and operating system 2308 to provide output and results.

Output/results may be presented by a GUI 2318B on the display 2322 or provided to another device for presentation or further processing or action. In one embodiment, the display 2322 comprises a liquid crystal display (LCD) having a plurality of separately addressable pixels formed by liquid crystals. Each pixel of the display 2322 changes to an opaque or translucent state to form a part of the image on the display in response to the data or information generated by the processor 2304 from the application of the instructions of the computer program 2310 and/or operating system 2308 to the input and commands. Other display 2322 types also include picture elements that change state in order to create the image presented on the display 2322. The image may be provided through a graphical user interface (GUI) module 2318A. Although the GUI module 2318A is depicted as a separate module, the instructions performing the GUI functions can be resident or distributed in the operating system 2308, the computer program 2310, or implemented with special purpose memory and processors.

Some or all of the operations performed by the computer 2302 according to the computer program 2310 instructions may be implemented in a special purpose processor 2304B. In this embodiment, some or all of the computer program 2310 instructions may be implemented via firmware instructions stored in a read only memory (ROM), a programmable read only memory (PROM) or flash memory within the special purpose processor 2304B or in memory 2306. The special purpose processor 2304B may also be hardwired through circuit design to perform some or all of the operations to implement the present invention. Further, the special purpose processor 2304B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 2302 may also implement a compiler 2312 which allows an application program 2310 written in a programming language such as COBOL, C++, FORTRAN, or other language to be translated into processor 2304 readable code. After completion, the application or computer program 2310 accesses and manipulates data accepted from I/O devices and stored in the memory 2306 of the computer 2302 using the relationships and logic that was generated using the compiler 2312.

The computer 2302 also optionally comprises an external communication device such as a modem, satellite link, Ethernet card, or other device for accepting input from and providing output to other computers.

In one embodiment, instructions implementing the operating system 2308, the computer program 2310, and/or the compiler 2312 are tangibly embodied in a computer-readable medium, e.g., data storage device 2320, which could include one or more fixed or removable data storage devices, such as a zip drive, floppy disc drive 2324, hard drive, CD-ROM drive, tape drive, or a flash drive. Further, the operating system 2308 and the computer program 2310 are comprised of computer program instructions which, when accessed, read and executed by the computer 2302, causes the computer 2302 to perform the steps necessary to implement and/or use the present invention or to load the program of instructions into a memory, thus creating a special purpose data structure causing the computer to operate as a specially programmed computer executing the method steps described herein. Computer program 2310 and/or operating instructions may also be tangibly embodied in memory 2306 and/or data communications devices 2330, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 2302.

Although the terms processor or computer are referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing a media program of a plurality of media programs to a user device directly from a selected content provider of a plurality of content providers via a content provider playback application executed by the user device, the content provider playback application provided and maintained by the content provider of the media program, comprising:
   receiving a registration request having registration information from a user device in a subscription management service, the registration request to subscribe the user to the selected content provider providing the media program;
   brokering between the user device and the content provider to subscribe the user to the selected content provider providing the media program, comprising:
      determining if the user is subscribed to the selected content provider;
      if the user is not subscribed to the selected content provider, subscribing the user to the selected content provider; and
      transmitting payment for the subscription of the user from the subscription management service to the selected content provider and billing the user for the subscription to the selected content provider;
   transmitting program guide information of the plurality of media programs including the media program from the subscription management service to the user device for presentation by the user device;
   receiving a playback request from a program guide presented by the user device using the program guide information, the playback request comprising a user selection of the media program from the selected content provider for presentation exclusively by the content provider playback application executed by the user device, the content provider playback application provided to the user device and maintained by the selected content provider of the media program; and
   enabling presentation of the media program from the selected content provider by the content provider playback application executed by the user device.

2. The method of claim 1, wherein the user is subscribed to the selected content provider using the registration information.

3. The method of claim 1, further comprising:
   irretrievably passing control of the user device to the content provider playback application of the selected one of the content providers to receive and play back the media program from the selected content provider.

4. The method of claim 1, wherein:
   the user device comprises a subscription navigation application;
   the registration request is received from the user device executing the subscription navigation application; and
   the program guide information is presented by the subscription navigation application.

5. The method of claim 4, wherein:
   each of the plurality of content providers provides and maintains an associated content provider playback application for playing back the one or more of a plurality of media programs provided by the respective content provider;
   the subscription navigation application comprises a content provider application manager for:
      determining if the user device includes a content provider playback application capable of playing the selected media program; and
      if the user device does not include a content provider playback application capable of playing the selected media program, retrieving the content provider playback application capable of playing the selected media program from the content provider and installing the content provider playback application capable of playing the selected media program on the user device.

6. The method of claim 5, wherein the subscription navigation application further:
   accepts user favorite information from the user, the user favorite information describing a plurality of media programs of interest to the user;
   determines which of the plurality of content provider playback applications are required for playback of each of the plurality of media programs of interest by the user device; and
   provides, in a single user interface, a visual representation associated with each of the determined plurality of content provider playback applications for display, the visual representation indicating whether each such content provider playback application is installed or is not installed on the user device.

7. The method of claim 6, wherein the subscription navigation application further:
   accepts, using the visual representation, user input selecting content provider playback applications not installed on the user device and required for playback of an associated media program of interest; and
   installs each of the user selected content provider playback applications not installed on the user device as a group automatically.

8. The method of claim 1, wherein the step of enabling presentation of the media program from the selected content provider by the content provider playback application executed by the user device comprises:
   receiving a request comprising the registration information from the content provider;
   determining, at least in part from the registration information, if the user is a subscriber to the selected content; and
   transmitting a confirmation to the content provider only if the user is a subscriber to the selected content.

9. The method of claim 1, wherein the step of enabling presentation of the selected media program from the content provider by the content provider playback application executed by the user device comprises:
   receiving a request from the content provider for the registration information;
   determining if the user is a subscriber to the selected content; and
   if the user is a subscriber to the selected content, transmitting the registration information to the content provider.

10. The method of claim 1, wherein one or more media programs are unavailable from the selected content provider without subscription.

11. A system for providing a media program of a plurality of media programs to a user device directly from a selected content provider of a plurality of content providers via a content provider playback application executed by the user device, the content provider playback application provided and maintained by the content provider of the media program, comprising:
- a processor;
- a memory, the memory communicatively coupled to the processor and storing processor instructions for performing steps comprising the steps of:
  - receiving a registration request having registration information from a user device in a subscription management service, the registration request to subscribe the user to the selected content provider providing the media program;
  - brokering between the user device and the content provider to subscribe the user to the selected content provider providing the media program;
  - transmitting program guide information of the plurality of media programs including the media program from the subscription management service to the user device for presentation by the user device;
  - receiving a playback request from a program guide presented by the user device using the program guide information, the playback request comprising a user selection of the media program from the selected content provider for presentation exclusively by the content provider playback application executed by the user device, the content provider playback application provided to the user device and maintained by the selected content provider of the media program; and
  - enabling presentation of the media program from the selected content provider by the content provider playback application executed by the user device,
- wherein the processor instructions for brokering between the user device and the content provider to subscribe the user to the selected content provider providing the media program comprise instructions for:
  - determining if the user is subscribed to the selected content provider;
  - subscribing the user to the selected content provider if the user is not subscribed to the selected content provider; and
  - transmitting payment for the subscription of the user from the subscription management service to the selected content provider and billing the user for the subscription to the selected content provider.

12. The system of claim 11, wherein the user is subscribed to the selected content provider using the registration information.

13. The system of claim 11, wherein the instructions further comprise instructions for:
  - irretrievably passing control of the user device to the content provider playback application of the selected one of the content providers to receive and play back the media program from the selected content provider.

14. The system of claim 11, wherein:
  - the user device comprises a subscription navigation application;
  - the registration request is received from the user device executing the subscription navigation application; and
  - the program guide information is presented by the subscription navigation application.

15. The system of claim 14, wherein:
  - each of the plurality of content providers provides and maintains an associated content provider playback application for playing back the one or more of a plurality of media programs provided by the respective content provider;
  - the subscription navigation application comprises a content provider application manager for:
    - determining if the user device includes a content provider playback application capable of playing the selected media program; and
    - if the user device does not include a content provider playback application capable of playing the selected media program, retrieving the content provider playback application capable of playing the selected media program from the content provider and installing the content provider playback application capable of playing the selected media program on the user device.

16. The system of claim 15, wherein the subscription navigation application further:
  - accepts user favorite information from the user, the user favorite information describing a plurality of media programs of interest to the user;
  - determines which of the plurality of content provider playback applications are required for playback of each of the plurality of media programs of interest by the user device; and
  - provides, in a single user interface, a visual representation associated with each of the determined plurality of content provider playback applications for display, the visual representation indicating whether each such content provider playback application is installed or is not installed on the user device.

17. The system of claim 16, wherein the subscription navigation application further:
  - accepts, using the visual representation, user input selecting content provider playback applications not installed on the user device and required for playback of an associated media program of interest; and
  - installs each of the user selected content provider playback applications not installed on the user device as a group automatically.

18. The system of claim 11, wherein the instructions for enabling presentation of the media program from the selected content provider by the content provider playback application executed by the user device comprises instructions for:
  - receiving a request comprising the registration information from the content provider;
  - determining, at least in part from the registration information, if the user is a subscriber to the selected content; and
  - transmitting a confirmation to the content provider only if the user is a subscriber to the selected content.

19. The system of claim 11, wherein the instructions for enabling presentation of the selected media program from the content provider by the content provider playback application executed by the user device comprise instructions for:
  - receiving a request from the content provider for the registration information;
  - determining if the user is a subscriber to the selected content; and
  - if the user is a subscriber to the selected content, transmitting the registration information to the content provider.

20. The system of claim 11, wherein one or more media programs are unavailable from the selected content provider without subscription.

21. A system for providing a media program of a plurality of media programs to a user device directly from a selected content provider of a plurality of content providers via a content provider playback application executed by the user device, the content provider playback application provided and maintained by the content provider of the media program, comprising:
- means for receiving a registration request having registration information from a user device in a subscription management service, the registration request to subscribe the user to the selected content provider providing the media program;
- means for brokering between the user device and the content provider to subscribe the user to the selected content provider providing the media program;
- means for transmitting program guide information of the plurality of media programs including the media program from the subscription management service to the user device for presentation by the user device;
- means for receiving a playback request from a program guide presented by the user device using the program guide information, the playback request comprising a user selection of the media program from the selected content provider for presentation exclusively by the content provider playback application executed by the user device, the content provider playback application provided to the user device and maintained by the selected content provider of the media program; and
- means for enabling presentation of the media program from the selected content provider by the content provider playback application executed by the user device, comprising:
  - means for receiving a request comprising the registration information from the content provider;
  - means for determining, at least in part from the registration information, if the user is a subscriber to the selected content; and
  - means for transmitting a confirmation to the content provider only if the user is a subscriber to the selected content.

22. The system of claim 21, wherein the means for brokering between the user device and the content provider to subscribe the user to the selected content provider providing the media program comprises:
- means for determining if the user is subscribed to the selected content provider;
- means for subscribing the user to the selected content provider if the user is not subscribed to the selected content provider; and
- means for transmitting payment for the subscription of the user from the subscription management service to the selected content provider and billing the user for the subscription to the selected content provider.

23. A system for providing a media program of a plurality of media programs to a user device directly from a selected content provider of a plurality of content providers via a content provider playback application executed by the user device, the content provider playback application provided and maintained by the content provider of the media program, comprising:
- means for receiving a registration request having registration information from a user device in a subscription management service, the registration request to subscribe the user to the selected content provider providing the media program;
- means for brokering between the user device and the content provider to subscribe the user to the selected content provider providing the media program;
- means for transmitting program guide information of the plurality of media programs including the media program from the subscription management service to the user device for presentation by the user device;
- means for receiving a playback request from a program guide presented by the user device using the program guide information, the playback request comprising a user selection of the media program from the selected content provider for presentation exclusively by the content provider playback application executed by the user device, the content provider playback application provided to the user device and maintained by the selected content provider of the media program; and
- means for enabling presentation of the media program from the selected content provider by the content provider playback application executed by the user device, comprising:
  - means for receiving a request from the content provider for the registration information;
  - means for determining if the user is a subscriber to the selected content; and
  - means for transmitting the registration information to the content provider if the user is a subscriber to the selected content.

24. The system of claim 23, wherein the means for brokering between the user device and the content provider to subscribe the user to the selected content provider providing the media program comprises:
- means for determining if the user is subscribed to the selected content provider;
- means for subscribing the user to the selected content provider if the user is not subscribed to the selected content provider; and
- means for transmitting payment for the subscription of the user from the subscription management service to the selected content provider and billing the user for the subscription to the selected content provider.

* * * * *